(12) United States Patent
Konradsson et al.

(10) Patent No.: US 11,297,575 B2
(45) Date of Patent: *Apr. 5, 2022

(54) SYSTEM AND METHOD FOR LOW-POWER WIRELESS BEACON MONITOR

(71) Applicant: Innophase, Inc., San Diego, CA (US)

(72) Inventors: Per Konradsson, Järfälla (SE); Yang Xu, San Diego, CA (US)

(73) Assignee: INNOPHASE INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,650

(22) Filed: Jun. 12, 2020

(65) Prior Publication Data

US 2021/0007048 A1 Jan. 7, 2021

Related U.S. Application Data

(62) Division of application No. 16/241,988, filed on Jan. 7, 2019, now Pat. No. 10,728,851.

(51) Int. Cl.
*H04W 52/02* (2009.01)
*H04W 88/08* (2009.01)
*H04W 48/20* (2009.01)

(52) U.S. Cl.
CPC ....... *H04W 52/0229* (2013.01); *H04W 48/20* (2013.01); *H04W 88/08* (2013.01)

(58) Field of Classification Search
CPC .. H04W 52/0229; H04W 48/20; H04W 88/08
(Continued)

(56) References Cited

U.S. PATENT DOCUMENTS

| 4,271,412 A | 6/1981 | Glass et al. |
| 4,322,819 A | 3/1982 | Hyatt |

(Continued)

FOREIGN PATENT DOCUMENTS

| EP | 1187313 A1 | 3/2002 |
| EP | 1187313 B1 | 2/2008 |

(Continued)

OTHER PUBLICATIONS

International Search Report and Written Opinion for PCT/US2014/029055, dated Sep. 15, 2014, 1-12 (12 pages).

(Continued)

*Primary Examiner* — Nghi H Ly
(74) *Attorney, Agent, or Firm* — Invention Mine LLC

(57) ABSTRACT

Selectively enabling an amplitude processing circuit and a phase processing circuit of a wireless station's polar receiver with respect to reception of a beacon signal. Such systems and methods may include sequentially demodulating symbols of the received beacon signal using at least the phase processing circuit to detect a traffic indication signal value in a data payload portion of the received beacon signal. Upon detecting a condition indicating no data traffic for the wireless station, the phase processing circuit may be turned off. The polar receiver may demodulate symbols of the received beacon signal and upon detecting a beacon preamble symbol sequence, shut off the amplitude processing circuit and set the amplitude to a fixed value. The phase processing circuit in conjunction with the fixed amplitude value may be used to demodulate symbols of the beacon signal.

20 Claims, 9 Drawing Sheets

(58) Field of Classification Search
USPC .................. 455/574, 572, 550.1, 403, 73
See application file for complete search history.

(56) References Cited

U.S. PATENT DOCUMENTS

| | | | |
|---|---|---|---|
| 5,325,095 A | 6/1994 | Vadnais et al. | |
| 5,493,581 A | 2/1996 | Young et al. | |
| 5,635,864 A | 6/1997 | Jones | |
| 6,161,420 A | 12/2000 | Dilger et al. | |
| 6,369,659 B1 | 4/2002 | Delzer et al. | |
| 6,373,337 B1 | 4/2002 | Ganser | |
| 6,556,636 B1 | 4/2003 | Takagi | |
| 6,587,187 B2 | 7/2003 | Watanabe et al. | |
| 6,975,165 B2 | 12/2005 | Lopez et al. | |
| 7,042,958 B2 | 5/2006 | Biedka et al. | |
| 7,095,274 B2 | 8/2006 | Lopez et al. | |
| 7,193,462 B2 | 3/2007 | Braithwaite | |
| 7,313,198 B2 | 12/2007 | Rahman et al. | |
| 7,332,973 B2 | 2/2008 | Lee et al. | |
| 7,400,203 B2 | 7/2008 | Ojo et al. | |
| 7,447,272 B2 | 11/2008 | Haglan | |
| 7,453,934 B2 | 11/2008 | Seppinen et al. | |
| 7,564,929 B2 | 7/2009 | Lopez et al. | |
| 7,602,244 B1 | 10/2009 | Holmes et al. | |
| 7,773,713 B2 | 8/2010 | Cafaro et al. | |
| 7,888,973 B1 | 2/2011 | Rezzi et al. | |
| 8,314,653 B1 | 11/2012 | Granger-Jones et al. | |
| 8,368,477 B2 | 2/2013 | Moon et al. | |
| 8,421,661 B1 | 4/2013 | Jee et al. | |
| 8,498,601 B2 | 7/2013 | Horng et al. | |
| 8,666,325 B2 | 3/2014 | Shute et al. | |
| 8,712,483 B2 * | 4/2014 | Haartsen | H04B 5/0056 455/574 |
| 8,774,748 B2 | 7/2014 | Casagrande et al. | |
| 8,787,511 B2 | 7/2014 | Brunn et al. | |
| 8,804,875 B1 | 8/2014 | Xu et al. | |
| 8,854,091 B2 | 10/2014 | Hossain et al. | |
| 8,892,177 B2 * | 11/2014 | Behzad | H04W 52/028 455/574 |
| 8,929,486 B2 | 1/2015 | Xu et al. | |
| 8,941,441 B2 | 1/2015 | Testi et al. | |
| 9,024,696 B2 | 5/2015 | Li et al. | |
| 9,083,588 B1 | 7/2015 | Xu et al. | |
| 9,178,691 B2 | 11/2015 | Shimizu et al. | |
| 9,240,914 B2 | 1/2016 | Yao | |
| 9,391,625 B1 | 7/2016 | Xu et al. | |
| 9,479,177 B1 | 10/2016 | Buell et al. | |
| 9,497,055 B2 | 11/2016 | Xu et al. | |
| 9,519,035 B2 | 12/2016 | Ramirez | |
| 9,673,828 B1 | 6/2017 | Xu et al. | |
| 9,673,829 B1 | 6/2017 | Xu et al. | |
| 9,813,011 B2 | 11/2017 | Despesse | |
| 9,813,033 B2 | 11/2017 | Testi et al. | |
| 9,819,524 B2 | 11/2017 | Khoury et al. | |
| 9,853,843 B2 | 12/2017 | Talty et al. | |
| 9,985,638 B2 | 5/2018 | Xu et al. | |
| 10,122,397 B2 | 11/2018 | Xu et al. | |
| 10,148,230 B2 | 12/2018 | Xu et al. | |
| 10,158,509 B2 | 12/2018 | Xu et al. | |
| 10,320,403 B2 | 6/2019 | Xu et al. | |
| 10,622,959 B2 | 4/2020 | Testi et al. | |
| 10,728,851 B1 * | 7/2020 | Konradsson | H04W 48/20 |
| 11,045,654 B2 * | 6/2021 | Peichel | A61N 1/3956 |
| 2001/0001616 A1 | 5/2001 | Rakib et al. | |
| 2002/0048326 A1 | 4/2002 | Sahlman | |
| 2002/0132597 A1 | 9/2002 | Peterzell et al. | |
| 2003/0053554 A1 | 3/2003 | McCrokle et al. | |
| 2003/0058036 A1 | 3/2003 | Stillman et al. | |
| 2003/0142002 A1 | 7/2003 | Winner et al. | |
| 2003/0174783 A1 | 9/2003 | Rahman et al. | |
| 2004/0036538 A1 | 2/2004 | Devries et al. | |
| 2004/0100330 A1 | 5/2004 | Chandler | |
| 2004/0146118 A1 | 7/2004 | Talwalkar et al. | |
| 2005/0285541 A1 | 12/2005 | Lechevalier | |
| 2006/0078079 A1 | 4/2006 | Lu | |
| 2006/0145762 A1 | 7/2006 | Leete | |
| 2006/0193401 A1 | 8/2006 | Lopez et al. | |
| 2006/0222109 A1 | 10/2006 | Watanabe et al. | |
| 2006/0285541 A1 | 12/2006 | Roy | |
| 2007/0132511 A1 | 6/2007 | Ryynänen et al. | |
| 2008/0069514 A1 | 3/2008 | Son et al. | |
| 2008/0079497 A1 | 4/2008 | Fang et al. | |
| 2008/0112526 A1 | 5/2008 | Yi | |
| 2008/0150645 A1 | 6/2008 | McCorquodale et al. | |
| 2008/0170552 A1 | 7/2008 | Zaks | |
| 2008/0192872 A1 | 8/2008 | Lindoff | |
| 2008/0192877 A1 | 8/2008 | Eliezer et al. | |
| 2008/0205709 A1 | 8/2008 | Masuda et al. | |
| 2008/0211576 A1 | 9/2008 | Moffatt et al. | |
| 2008/0220735 A1 | 9/2008 | Kim et al. | |
| 2008/0225981 A1 | 9/2008 | Reddy et al. | |
| 2008/0225984 A1 | 9/2008 | Ahmed et al. | |
| 2008/0291064 A1 | 11/2008 | Johansson et al. | |
| 2009/0153244 A1 | 6/2009 | Cabanillas et al. | |
| 2009/0256601 A1 | 10/2009 | Zhang et al. | |
| 2009/0290660 A1 * | 11/2009 | Neugebauer | H04B 1/707 375/340 |
| 2009/0295493 A1 | 12/2009 | Lee et al. | |
| 2009/0302908 A1 | 12/2009 | Nakamura | |
| 2010/0303047 A1 | 12/2010 | Ibrahim et al. | |
| 2011/0003571 A1 | 1/2011 | Park et al. | |
| 2011/0019657 A1 | 1/2011 | Zaher | |
| 2011/0050296 A1 | 3/2011 | Fagg | |
| 2011/0159877 A1 | 6/2011 | Kenington et al. | |
| 2011/0260790 A1 | 10/2011 | Haddad | |
| 2011/0298557 A1 | 12/2011 | Kobayashi | |
| 2011/0299632 A1 | 12/2011 | Mirzaei et al. | |
| 2011/0300885 A1 | 12/2011 | Darabi et al. | |
| 2012/0032718 A1 | 2/2012 | Chan et al. | |
| 2012/0074990 A1 | 3/2012 | Sornin | |
| 2012/0256693 A1 | 10/2012 | Raghunathan et al. | |
| 2012/0306547 A1 | 12/2012 | Arora et al. | |
| 2013/0143509 A1 | 6/2013 | Horng et al. | |
| 2013/0257494 A1 | 10/2013 | Nikaeen et al. | |
| 2014/0023163 A1 | 1/2014 | Xu | |
| 2014/0133528 A1 | 5/2014 | Noest et al. | |
| 2014/0185723 A1 | 7/2014 | Belitzer | |
| 2014/0266454 A1 | 9/2014 | Testi et al. | |
| 2014/0266480 A1 | 9/2014 | Li et al. | |
| 2014/0269999 A1 | 9/2014 | Cui et al. | |
| 2014/0270003 A1 | 9/2014 | Xu et al. | |
| 2014/0321479 A1 | 10/2014 | Zhang et al. | |
| 2015/0180685 A1 | 6/2015 | Noest et al. | |
| 2015/0207499 A1 | 7/2015 | Horng et al. | |
| 2015/0229318 A1 | 8/2015 | Tamura et al. | |
| 2016/0074224 A1 | 3/2016 | Scheller et al. | |
| 2016/0139568 A1 | 5/2016 | Schimper | |
| 2016/0155558 A1 | 6/2016 | Groves et al. | |
| 2016/0169717 A1 | 6/2016 | Zhitomirsky | |
| 2017/0085405 A1 | 3/2017 | Xu et al. | |
| 2017/0163272 A1 | 6/2017 | Xu et al. | |
| 2017/0187364 A1 | 6/2017 | Park et al. | |
| 2017/0194973 A1 | 7/2017 | Moehlmann | |
| 2018/0196972 A1 | 7/2018 | Lu et al. | |
| 2018/0205384 A1 | 7/2018 | Lee | |
| 2018/0287646 A1 | 10/2018 | Xu et al. | |
| 2019/0059055 A1 | 2/2019 | Murali | |
| 2020/0083857 A1 | 3/2020 | Testi et al. | |

FOREIGN PATENT DOCUMENTS

| | | |
|---|---|---|
| JP | H07221570 A | 8/1995 |
| JP | H1188064 A | 3/1999 |
| JP | 2012134981 A | 7/2012 |
| KR | 20150007728 A | 1/2015 |
| WO | 2005078921 A2 | 8/2005 |
| WO | 2005078921 A3 | 4/2006 |
| WO | 2012132847 A1 | 10/2012 |

OTHER PUBLICATIONS

International Search Report and Written Opinion for PCT/US2016/053484, dated Dec. 19, 2016, 1-8 (8 pages).

(56) References Cited

OTHER PUBLICATIONS

International Search Report and Written Opinion for PCT/US2016/064772, dated Feb. 28, 2017, 1-7 (7 pages).
International Preliminary Report on Patentability for PCT/US2018/027222 completed Apr. 4, 2019, dated Jun. 20, 2019, 1-3 (3 pages).
International Search Report and Written Opinion for PCT/US2014/030525, dated Jul. 24, 2014, 1-16 (16 pages).
International Search Report and Written Opinion for PCT/US2014/026459, dated Jul. 28, 2014, 1-10 (10 pages).
International Search report and Written Opinion for PCT/US20/12607, May 7, 2020, 1-17 (17 pages).
International Search Report and Written Opinion of the International Searching Authority for PCT/US13/024159, Apr. 9, 2013, 1-8 (8 pages).
International Search Report and Written Opinion for PCT/US2019/067237, dated Apr. 24, 2020, 1-14 (14 pages).
International Search Report and Written Opinion for PCT/US2019/049493, dated Apr. 29, 2020, 1-10 (10 pages).
International Search Report and Written Opinion for PCT/US2019/057432, dated Apr. 6, 2020, 1-9 (9 pages).
International Preliminary Report on Patentability for PCT/US2016/064772, dated Jun. 14, 2018, 1-6 (6 pages).
International Search report and Written Opinion for PCT/US18/27222, dated Jun. 28, 2018, 1-6 (6 pages).
Aeroflex, "Measurement of Frequency Stability and Phase Noise", Application Note, Part No. 46891/865, Issue 1, Feb. 2007, 1-8 (8 pages).
Betancourt-Zamora, Rafael, et al., "1-GHz and 2.8-GHz CMOS Injection-Locked Ring Oscillator Prescalers", Allen Center for Integrated Systems, Stanford University, Conference Paper, Feb. 2001, 1-5 (5 pages).
Buckel, Tobias, et al., "A Highly Reconfigurable RF-DPLL Phase Modulator for Polar Transmitters in Cellular RFICs", IEEE Transactions on Microwave Theory and Techniques, vol. 66, No. 6, Jun. 2018, 2618-2627 (10 pages.
Chen, Chi-Tsan, et al., "Cognitive Polar Receiver Using Two Injection-Locked Oscillator Stages", IEEE Transactions on Microwave Theory and Techniques, vol. 59, No. 12, Dec. 2011, 3484-3493 (10 pages).
Chen, Chi-Tsan, et al., "Wireless Polar Receiver Using Two Injection-Locked Oscillator Stages for Green Radios", IEEE MTT-S International, Jun. 2011, 1-4 (4 pages).
Cheng, Jiao, et al., "A 1.3mW 0.6V WBAN-Compatible Sub-Sampling PSK Receiver in 65nm CMOS", IEEE International Solid-State Circuits Conference, ISSCC Session 9.6, Feb. 11, 2014, 168-170 (3 pages).
Chien, Jun-Chau, et al., "Analysis and Design of Wideband Injection-Locked Ring Oscillators With Multiple-Input Injection", IEEE Journal of Solid-State Circuits, vol. 42, No. 9, Sep. 2007, 1906-1915 (10 pages).
Darvishi, Milad, et al., "A 0.3-to-1 2GHz Tunable 4th-Order Switched gm-C Bandpass Filter with >55dB Ultimate Rejection and Out-of-Band IIP3 of +29dBm", 2012 IEEE International Solid-State Circuits Conference, Session 21.1, 2012, 358-360 (3 pages).
Dudek, Piotr, et al., "A High-Resolution CMOS Time-to-Digital Converter Utilizing a Vernier Delay Line", IEEE Transactions on Solid-State Circuits, vol. 35, No. 2, Feb. 2000, 240-247 (8 pages).
Effendrik, Popong, "Time-to-Digital Converter (TDC) for WiMAX ADPLL in State-of-The-Art 40-nm CMOS", MSc Theses, Delft University of Technology, Apr. 18, 2011, 1-80 (80 pages).
Frantz, Claude, "Frequency Discriminator", DJ0OT, 1994, 1-7 (7 pages).
He, Xin, et al., "A 2.5-GHz Low-Power, High Dynamic Range, Self-Tuned Q-Enhanced LC Filter in SOI", IEEE Journal of Solid-State Circuits, vol. 40, No. 8, Aug. 2005, 1618-1628 (11 pages).
He, Xin, et al., "A Fully Integrated Q-enhanced LC Filter with 6 dB Noise Figure at 2.5 GHz in SOI", IEEE Radio Frequency Integrated Circuits Symposium, 2004, 643-646 (4 pages).

Henzler, S., "Time to Digital Converters", Springer Series in Advanced Microelectronics 29, Chapter 2, Springer Science+Business Media B.V., 2010, 5-19 (15 pages).
Hewlett Packard, "Phase Noise Characterization of Microwave Oscillators", Frequency Discriminator Method, Product Note 11729C-2, Sep. 1985, 1-45 (45 pages).
Jovanovic, G.S., et al., "Vernier's Delay Line Time-to-Digital Converter", Scientific Publications of the State University of Novi Pazar, Ser. A: Appl. Math. Inform. and Mech., vol. 1, 1, 2009, 11-20 (10 pages).
Li, Xiaoyong, et al., "20-Mb/s GFSK Modulator Based on 3.6-GHz Hybrid PLL with 3-b DCO Nonlinearity Calibration and Independent Delay Mismatch Control", IEEE Transactions on Microwave Theory and Techniques, vol. 65, No. 7, Jul. 2017, 2387-2398 (12 pages).
Li, Dandan, et al., "Design Techniques for Automatically Tuned Integrated Gigahertz-Range Active LC Filters", IEEE Journal of Solid-State Circuits, vol. 37, No. 8, Aug. 2002, 967-977 (11 pages).
Liao, Dongyi, et al., "An 802.11a/b/g/n Digital Fractional-N PLL With Automatic TDC Linearity Calibration for Spur Cancellation", IEEE Journal of Solid-State Circuits, 0018-9200, Jan. 16, 2017, 1-11 (11 pages).
Lin, Chin-Hsin, et al., "Single-Stage Vernier Time-to-Digital Converter with Sub-Gate Delay Time Resolution", Scientific Research, Circuits and Systems, vol. 2, Oct. 2011, 365-371 (7 pages).
Liscidini, Antonio, et al., "Time to Digital Converter based on a 2-dimensions Vernier architecture", University of Pavia, IEEE Custom Integrated Circuits Conference, Sep. 13, 2009, 1-4 (4 pages).
López-Villegas, José Maria, et al., "BPSK to ASK Signal Conversion Using Injection-Locked Oscillators-Part I: Theory", IEEE Transactions on Microwave Theory and Techniques, vol. 53, No. 12, Dec. 2005, 3757-3766 (10 pages).
Markulic, Nereo, et al., "A self-calibrated 10Mb/s phase modulator with -37.4dB EVM based on a 10.1-to-12.4GHz, -246.6dB-FOM, fractional-n subsampling PLL", IEEE International Solid-State Circuits Conference (ISSCC), San Francisco, Session 9.7, 2016, 176-178 (3 pages).
Marzin, Giovanni, et al., "A 20Mb/s Phase Modulator Based on a 3.6GHz Digital PLL with -36dB EVM at 5 mW Power", IEEE International Solid-State Circuits Conference, vol. 47, No. 12, Dec. 2012, 2974-2988 (15 pages).
Mirzaei, Ahmad, et al., "Multi-Phase Injection Widens Lock Range of Ring-Oscillator-Based Frequency Dividers", IEEE Journal of Solid-State Circuits, vol. 43, No. 3, Mar. 2008, 656-671 (16 pages.
Nazari, Peyman, "Polar Quantizer for Wireless Receivers: Theory, Analysis, and CMOS Implementation", IEEE Transactions on Cricuits and Systems, vol. 61, No. 3, Mar. 2014, 1-94 (94 pages).
O'Brien, Paul, "A Comparison of Two Delay Line Discriminator Implementations for Low Cost Phase Noise Measurement", Analog Devices Raheen Business Park Limerick Ireland, 2010, 1-11 (11 pages).
Pellerano, Stefano, et al., "A 4.75-GHz Fractional Frequency Divider-by-1.25 With TDC-Based All-Digital Spur Calibration in 45-nm CMOS", IEEE Journal of Solid-State Circuits, vol. 44, No. 12, Dec. 2009, 3422-3433 (12 pages).
Putnam, William, et al., "Design of Fractional Delay Filters Using Convex Optimization", IEEE ASSP Workshop on Applications of Signal Processing to Audio and Acoustics (CCRMA), Stanford University, 1997, 1-5 (5 pages).
Rategh, Hamid R., et al., "Superharmonic Injection Locked Oscillators as Low Power Frequency Dividers", Stanford University, Symposium on VLSI Circuits, Digest of Technical Papers, Jun. 1998, 1-4 (4 pages).
Razavi, Behzad, "A Study of Injection Pulling and Locking in Oscillators", Electrical Engineering Department, University of California, IEEE Custom Integrated Circuits Conference, 2003, 305-312 (8 pages).
Ross, Andrew, "Power Save Issues in WLAN", Silex Technology America, Inc., 2014, 1-35 (35 pages).
Siripon, N., et al., "Novel Sub-Harmonic Injection-Locked Balanced Oscillator", Microwave and Systems Research Group (MSRG),

(56) References Cited

OTHER PUBLICATIONS

School of Electronics, Computing and Mathematics, University of Surrey, 31st European Microwave Conference, Sep. 24, 2011, 1-4 (4 pages).

Testi, Nicolo, et al., "A 2.4GHz 72dB-Variable-Gain 100dB-DR 7.8mW 4th-Order tunable Q-Enhanced LC Band-Pass Filter", IEEE Radio Frequency Integrated Circuits Symposium (RFIC), 2015, 87-90 (4 pages).

Tiebout, Marc, "A 50GHz Direct Injection Locked Oscillator Topology as Low Power Frequency Divider in 0.13 µm CMOS", Infineon Technologies AG, Solid-State Circuits Conference, 29th European ESSCIRC, 2003, 1-4 (4 pages).

Tsai, Pei-Kang, et al., "Wideband Injection-Locked Divide-by-3 Frequency Divider Design with Regenerative Second-Harmonic Feedback Technique", Wideband Injection-Locked Divide-by-3 Frequency Divider Design with Regenerative Second-Harmonic Feedback Technique, Mar. 21, 2013, 1-4 (4 pages).

US Navy, "Electronic Warfare and Radar Systems Engineering Handbook", Naval Air Systems Command and Naval Air Warfare Center, USA, Mixers and Frequency Discriminators, Section 6-8.1 to 6-8.2, Apr. 1, 1999, 1-299 (299 pages).

Winoto, Renaldi, et al., "A 2x2 WLAN and Bluetooth Combo SoC in 28nm CMOS with On-Chip WLAN Digital Power Amplifier, Integrated 2G/BT SP3T Switch and BT Pulling Cancelation", IEEE International Solid-State Circuits Conference, ISSCC 2016, Session 9.4, High-Performance Wireless, Feb. 2, 2016, 170-172 (3 pages).

Wiser, Robert F., et al., "A 5-GHz Wireless LAN Transmitter with Integrated Tunable High-Q RF Filter", IEEE Journal of Solid-State Circuits, vol. 44, No. 8, Aug. 2009, 2114-2125 (12 pages).

Yu, Jianjun, et al., "A 3-Dimensional Vernier Ring Time-to-digital Converter in 0.13µm CMOS", Electrical and Computer Engineering, Auburn University, Auburn AL, Sep. 19, 2010, 1-4 (4 pages).

Buckel, Tobias, et al., "A Novel Digital-Intensive Hybrid Polar-I/Q RF Transmitter Architecture", IEEE Transactions on Circuits and Systems—1, Regular Papers, vol. 65, No. 12, Dec. 2018, 4390-4403 (14 pages).

\* cited by examiner

| SYNC 602 | MAC HEADER 604 | FRAME BODY 606 | FCS 608 |

| TIME STAMP 632 | BEACON INTEVAL 634 | CAPABILITY INFO. 636 | SSID 638 | SUPPORTED RATES 640 | ... | TIM 642 | OTHER FRAME BODY FIELDS 644 |

| ELEMENT ID 672 | LENGTH 674 | DTIM COUNT 676 | DTIM PERIOD 678 | BITMAP CONTROL 680 | PARTIAL VIRTUAL BITMAP 682 |

| BITS 1-7: BITMAP OFFSET 694 | BIT 0: BROADCAST DATA AVAIL. 692 |

SYSTEM AND METHOD FOR LOW-POWER
WIRELESS BEACON MONITOR

CROSS-REFERENCE TO RELATED
APPLICATIONS

This present application is a Divisional of U.S. application Ser. No. 16/241,988, filed Jan. 7, 2019, entitled "SYSTEM AND METHOD FOR LOW-POWER WIRELESS BEACON MONITOR," which is hereby incorporated by reference in its entirety.

BACKGROUND

Some WiFi receivers consume significant amounts of power. Such wireless devices may process all traffic received by the wireless device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6A is message structure diagram for a beacon message according to some embodiments.

FIG. 6B is a message structure diagram for frame body fields according to some embodiments.

FIG. 6C is a message structure diagram for a TIM information element according to some embodiments.

FIG. 6D is a message structure diagram for a bitmap control byte within a TIM information element according to some embodiments.

Figure 1:
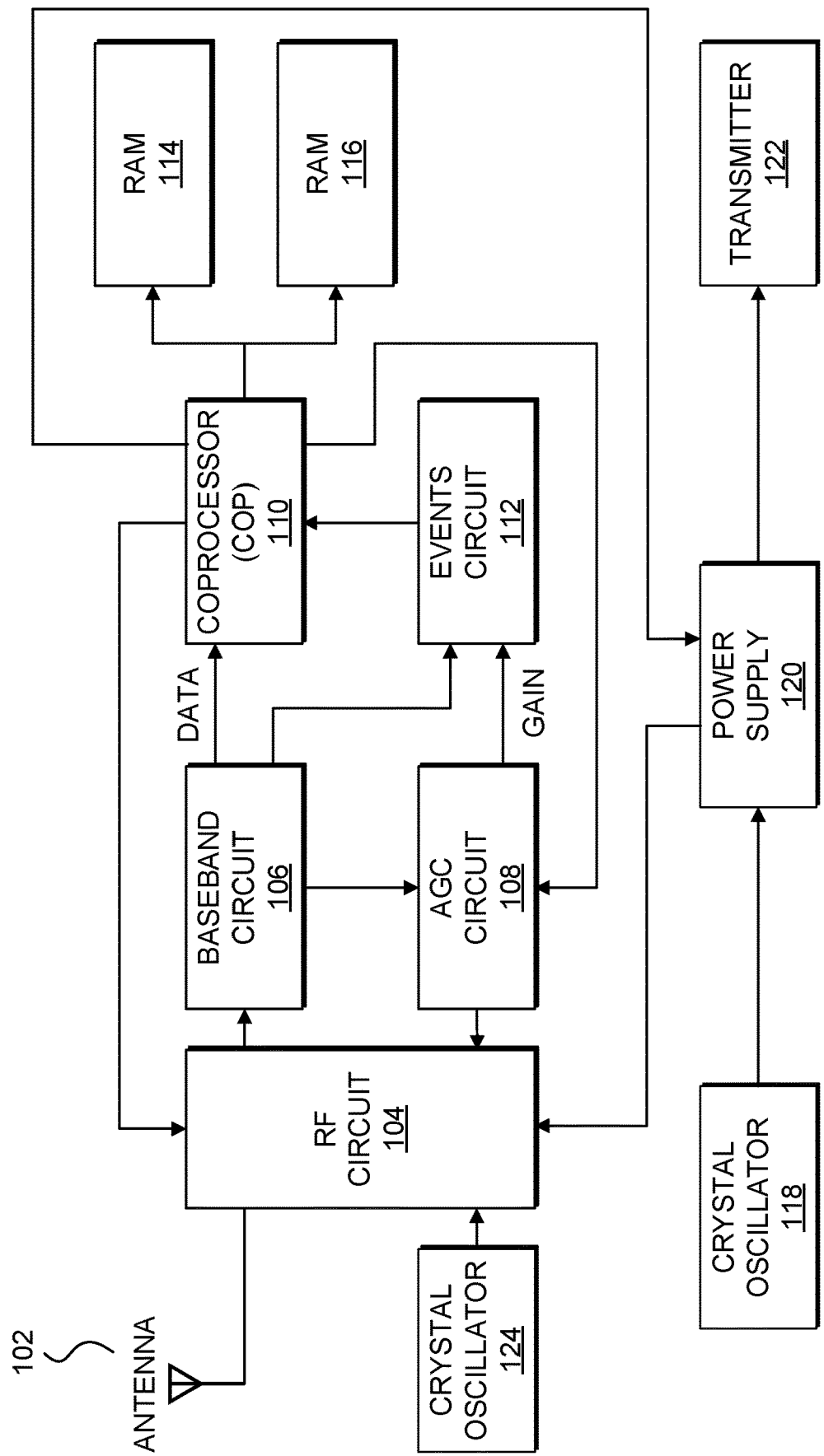
FIG. 1 is a functional block diagram of gain and event processing components for a wireless reception and power control system according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description of the drawings.

DETAILED DESCRIPTION

This application is related to U.S. patent application Ser. No. 15/655,676, filed Jul. 20, 2017 and entitled "Polar Receiver System and Method for Bluetooth Communications," now U.S. Pat. No. 10,122,397, the entirety of which is hereby incorporated by reference, and which claims the benefit of U.S. Provisional Patent Application No. 62/477,999, filed Mar. 28, 2017, the entirety of which is hereby incorporated by reference.

FIG. 1 is a functional block diagram of gain and event processing components for a wireless reception and power control system 100 according to some embodiments. For some embodiments, a Wi-Fi beacon signal may be received by antenna 102. A beacon signal, e.g., a modulated beacon signal such as a bi phase-shift keying (BPSK) or quadrature phase-shift keying (QPSK) signal, may be processed by an RF circuit 104. In some embodiments, the RF circuit 104 may include a receiver, e.g., a polar receiver. The RF circuit 104 implemented as, e.g., a polar receiver, may have an amplitude processing path and a phase processing path. An example configuration of an RF circuit implemented as a polar receiver may be the configurable receiver 200 shown in FIG. 2. In some embodiments, the RF circuit 104, when implemented as a receiver, may provide digital output signals to a baseband circuit 106. The baseband circuit 106 may be configured to receive, e.g., I and Q (rectangular format) symbols for some embodiments. In some embodiments, the baseband circuit 106 may be configured to receive, e.g., amplitude and phase (polar format) signals.

In some embodiments, AGC circuit 108 may be configured to regulate a gain of the RF circuit 104. In some embodiments, the RF circuit 104 may include one or more low-noise amplifier (LNA) stages. In some embodiments, the AGC circuit 108 may be configured to regulate a gain of, e.g., the low-noise amplifier (LNA) to account for differences in signal strength of received beacon RF signals. In some embodiments, the AGC circuit 108 may converge an AGC value in an iterative manner after detecting a large signal power jump (such as detecting a signal level or signal power that exceeds a threshold), where the signal power jump requires a corresponding decrease in LNA gain. Gain related events, such as a detected large signal change and corresponding gain change by the AGC circuit 108, may be indicated to a coprocessor (COP) 110, e.g., a MAC coprocessor, using an event signal (e.g., "GAIN") provided to the COP 110, directly, or, e.g., by way of an events circuit 112. In some embodiments, the events circuit 112 may be used in conjunction with, e.g., gain values received from the AGC circuit 108 to generate a gain related event signal (such as a large gain change event signal, or AGC gain convergence subsequent to a large gain change) sent to the MAC coprocessor 110. Some embodiments use an AGC hardware accelerator to detect large signal level/power changes and to send event messages to the MAC coprocessor 110. For some embodiments, an AGC accelerator circuit calculates power, as shown in Eq. 1, using, e.g., I and Q values outputted from the RF circuit 104 (see, e.g., the receiver 200 of FIG. 2), according to the following relationship:

$$\text{Power}=I^2+Q^2 \qquad \text{Eq. 1}$$

Figure 2:
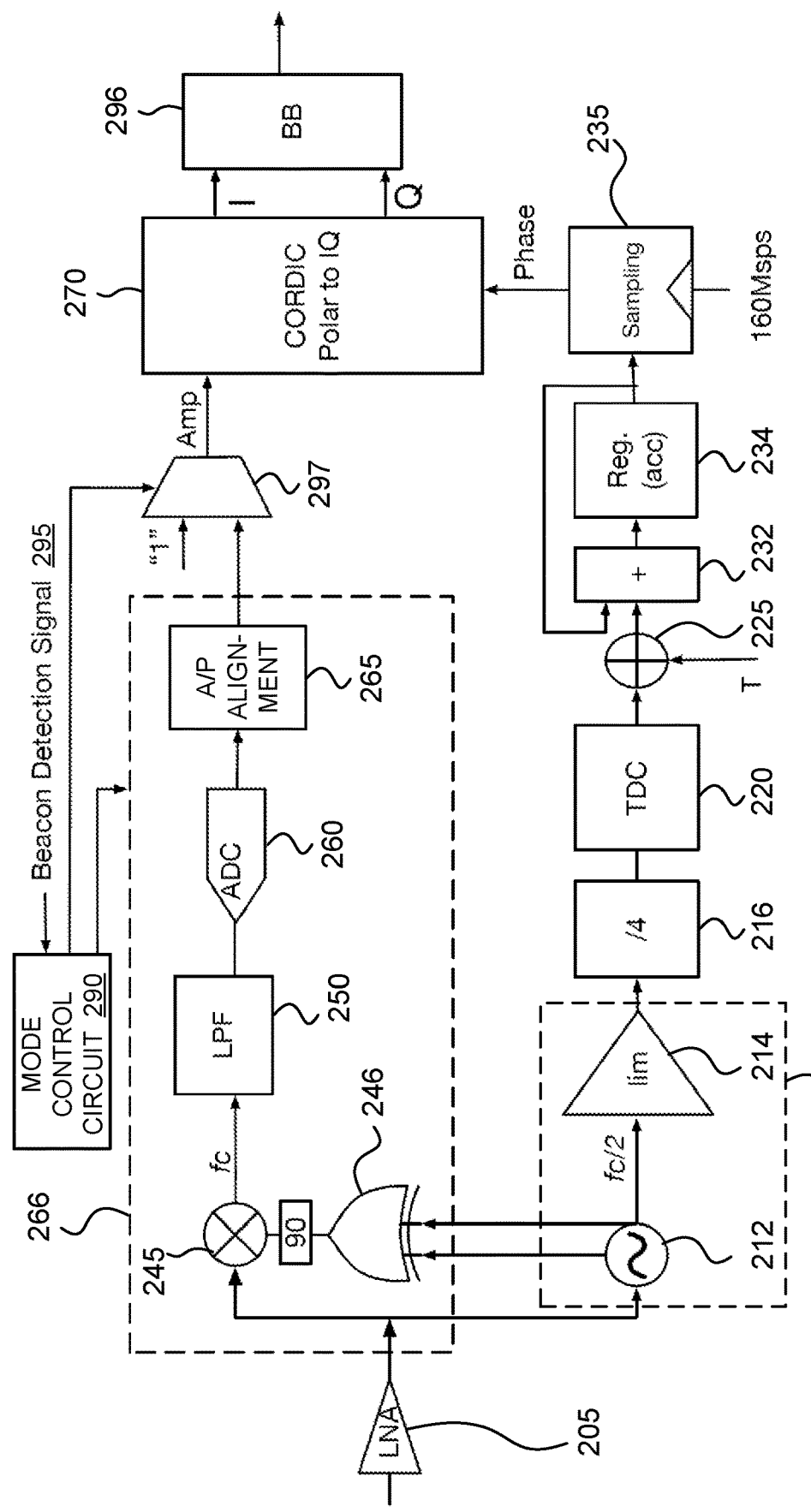
FIG. 2 is a functional block diagram of a configurable multi-mode receiver according to some embodiments.

Some embodiments calculate power, as shown in Eq. 2, using amplitude values from, e.g., an amplitude path, such as amplitude values outputted by RF circuit 104 (see, e.g., example amplitude detection circuit 266 from example configurable receiver 200 shown in FIG. 2):

$$\text{Power}=(\text{Amplitude})^2 \qquad \text{Eq. 2}$$

In some embodiments, the gain of the LNA stage(s) of the RF circuit 104 is adjusted until the power (which may be calculated as shown in Eq. 1 or Eq. 2 for some embodiments), or a low-pass filtered version of the power, is between two thresholds. For example, a low-pass filtered version of the power may be calculated. A large jump in receive signal power may be caused by the reception of a new beacon frame, which begins with a synchronization pattern. For some embodiments, the AGC value is adjusted based on received signal power. The AGC value may be adjusted until the output power level of the LNA does not exceed a threshold or is between two thresholds. Alternatively, the AGC may adjust the gain of the LNA based on sample values from the ADC 260 such that the conversion range of the ADC 260 is not exceeded. In some embodiments, detection of the synchronization pattern (which may cause a beacon detection signal to be generated) may be used to directly adjust receiver processing paths within the RF circuit 104, e.g., with direct control from the COP 110 (via a feedback path shown in FIG. 1) based on analysis of, e.g., digital signals from the baseband circuit 106. Upon occurrence of one or more events (e.g., reported to the COP 110 directly or by the events circuit 112), such as generation of a beacon detection signal (which may occur upon AGC convergence or detection of the synchronization pattern), some embodiments turn off an amplitude path of the RF circuit 104 and may replace the amplitude path result with a fixed amplitude value (such as a "1") for demodulating and processing symbols. In some embodiments, a beacon detecting signal may be an automatic gain control adjustment signal or a beacon preamble symbol sequence detection signal (e.g., based on a known or expected synchronization pattern in a beacon preamble).

The polar receiver generates amplitude and phase values associated with a received beacon signal. In some modes, for part of a beacon message, receive amplitude values may be replaced by fixed values (e.g., a "1", when an amplitude processing path is turned off), and phase values may be processed by the CORDIC to generate I and Q values used to further demodulate the received signal to recover beacon message data values. The baseband circuit 106 for some embodiments may include, e.g., circuits for correlation and detection of Barker sequences, Fast-Fourier Transform (FFT), interleaving, and Viterbi decoding algorithms. Some embodiments use a coprocessor to control operation of the correlation, Fast-Fourier Transform (FFT), interleaving, and Viterbi decoding circuits and algorithms. In some embodiments, control signals and/or power values are received by the AGC circuit 108. These control signals and/or power values are used to adjust the AGC value and resistive feedback and thereby the gain of the RF circuit 104 (e.g., one or more LNA stages in the circuit 104). The AGC circuit 108 outputs to the RF circuit 104 a control signal to control the gain of the LNA. The AGC circuit 108 outputs to the events circuit 112 a gain signal to indicate the gain value. In some embodiments, the events circuit 112 may receive events such as (and may combine events such as) the gain value with data values received from the baseband circuit, to, e.g., determine the occurrence of events associated with receiving a beacon message. The coprocessor 110 may be used in conjunction with the events circuit 112 to determine the timing of events for some embodiments. In some embodiments, the coprocessor 110 may provide, directly or indirectly, control signals and/or power values to affect power management of the RF circuit 104. In some embodiments, the coprocessor 110 may provide control signals to any of, e.g., the power supply 120, the RF circuit 104, the transmitter 122, and the AGC circuit 108, and so on. In some embodiments, the coprocessor 110 stores beacon message data values and event timing data in RAM 114, 116 (which may be internal or external to the coprocessor 110 for some embodiments). The coprocessor 110 has access to an external RAM bus for storage of data.

In some embodiments, further AGC adjustment may be inhibited after shutting off the amplitude processing circuit. For some embodiments, MAC coprocessor 110, for some embodiments, is used to sequentially process demodulated symbols in real-time. In some embodiments, a polar receiver may be configured to set a gain control value (e.g., an AGC value) to a fixed value and turn off the amplitude processing circuit. The amplitude processing circuit may be turned off based on one of the scenarios mentioned above. In some embodiments, the amplitude path may be turned off and a fixed value provided without using, e.g., gain control provided by the AGC circuit 108. Additional symbols (such as symbols received after turning off the amplitude processing circuit) may be sequentially demodulated using received phase values in combination with a fixed amplitude value.

As described further herein, the system 100 may include (or may communicate with) a timing control circuit such as a crystal oscillator 118 or an RC timing circuit. In some embodiments, the crystal oscillator 118 may continue to operate during a sleep mode of the wireless station, and may keep precise timing over extended time periods, e.g., during a sleep mode. A symbol demodulation crystal oscillator 124 is used to generate clock signals for demodulation. The bias current to the symbol demodulation crystal oscillator 124 may be increased for high resolution symbol demodulation. In some embodiments, the crystal oscillator 118, via a coprocessor 110, may communicate with a power supply 120 to power the system 100 (including RF circuit 104) back on. In some embodiments, a counter within the power supply may be programmed by the coprocessor, or the coprocessor may monitor the time/clock generated by the crystal, and responsively enable the power supply circuits to initiate the wake-up process. In some embodiments, during a sleep mode, in addition to the system 100 being turned off (which includes turning off the symbol demodulation crystal oscillator 124 of FIG. 1), a transmitter block (e.g., transmitter 122) may be turned off as well, and the crystal oscillator 118 may indirectly via a coprocessor 110, for example, turn the transmitter 122 back on. For simplicity, power supply lines are shown coming from the power supply 120 to, e.g., the RF circuit 104 and the coprocessor 110 and the transmitter 122, but generally the power supply 120 may power any number of circuits in the system 100. In some embodiments, the coprocessor 110 may communicate directly with the power supply 120 to control or adjust all or some of the power supplied by the power supply 120 to other circuits in the system 100. In some embodiments, the coprocessor 110 may include a power management unit (PMU). In some embodiments, the PMU may be located external to the coprocessor 110.

In some embodiments, the power supply 120 may include, or may interface with, low-drop out (LDO) voltage regulator circuits that may provide on-chip power management, which may be used to turn off specific circuits during a low power mode of operation. In some embodiments, a bias current control circuit may be used to cause selected circuits to shut off.

FIG. 2 is a functional block diagram of a configurable multi-mode receiver 200 according to some embodiments. In some embodiments, a configurable multi-mode receiver system and method for modulated signal communications is presented. In some embodiments, Wi-Fi communications using, e.g., constant envelope magnitude information and polar to rectangular (IQ) conversion and baseband low pass filtering are presented. It will be understood that examples presented in accordance with some embodiments may relate to Wi-Fi communications as well as, e.g., other communication specifications, e.g., low energy communication specifications. Some examples of a configurable receivers having, e.g., a low energy mode are described in U.S. Pat. No. 10,122,397, entitled "Polar Receiver System and Method for Bluetooth Communications", issued Nov. 6, 2018, which claims priority to a provisional application No. 62/477,999, filed Mar. 28, 2017, both of which are hereby incorporated by reference herein in their entirety.

In accordance with some embodiments, FIG. 2 shows an example configurable multi-mode receiver 200 receives an incoming radio-frequency (RF) signal through an input node (not shown), such as an antenna. In some embodiments, the incoming radio-frequency signal, which may be implemented as a modulated carrier signal, has a frequency in the range of 2412 MHz-2484 MHz, although, as appreciated by one of skill in the art, the use of the configurable receiver 200 is not limited to that frequency range. The incoming radio-frequency signal may be filtered by a bandpass filter (not shown) and amplified by a low-noise amplifier (LNA) 205 (e.g., one or more LNA stages 205). The configurable receiver 200 operates to receive and decode frequency modulated or phase-modulated radio-frequency signals, such as signals modulated using phase shift keying (PSK) or quadrature amplitude modulation (QAM). As the term is used in the present disclosure, phase-modulated signals include signals that are modulated in phase (e.g., binary phase-shift keying (BPSK), quadrature phase-shift keying (QPSK), 8-PSK, or 16-PSK) as well as signals that are modulated in both phase and amplitude (e.g., 16-QAM, 64-QAM, or 256-QAM). Frequency modulated signals include, among others, frequency shift keying (FSK) signals such as binary frequency-shift keying (BFSK) signals, multiple frequency-shift keying (MFSK) signals, and minimum-shift keying (MSK) signals.

In some embodiments, BPSK or QPSK modulated signals transmitted as beacons (from, e.g., an access point) are received and processed by the example configurable multi-mode receiver 200. It will be understood that BPSK and QPSK modulated signals are merely one example of received signals. While some of the embodiments described herein refer to the demodulation of phase-modulated signals (such as, e.g., QPSK), some embodiments also may be used to demodulate frequency-modulated (FM) signals, based on the mathematical relationship between changes in frequency and changes in phase.

The configurable receiver 200 may be provided with frequency division circuitry 210. The frequency division circuitry has an input for receiving the modulated radio-frequency input signal from the low-noise amplifier 205 and a frequency-divided output for providing a frequency-divided output signal to a trigger input of a time-to-digital converter (TDC) 220. The frequency division circuitry operates to divide the frequency of the input signal by a frequency divisor. In some embodiments, the frequency division circuitry may be implemented using a harmonic injection-locked oscillator, a digital frequency divider, or a combination thereof, among other possibilities. In one embodiment, the frequency division circuitry 210 may comprise an injection-locked oscillator 212, an amplitude limiter 214, and a frequency divider 216 (having a divisor such as 4, 8, 16, etc.).

A time-to-digital converter 220 may operate to measure a characteristic time of the frequency-divided signal, such as the period of the frequency-divided signal. The time-to-digital converter 220 may operate to measure the period of the frequency-divided signal by measuring an elapsed time between successive corresponding features of the frequency-divided signal. For example, the time-to-digital converter may measure the period of the frequency-divided signal by measuring a time between successive rising edges of the frequency-divided signal or the time between successive falling edges of the frequency-divided signal. In alternative embodiments, the time-to-digital converter may measure a characteristic time other than a complete period, such as an elapsed time between a rising edge and a falling edge of the frequency-divided signal. In a further embodiment, the TDC may measure features (i.e., rising edges, or falling edges) of the modulated signal with respect to an internal reference clock. In this manner, the phase measurement of the received signal may be made with respect to the internal timing signal. Frequency offsets between the received modulated signal (after frequency division, when present) may be accounted for by repeatedly removing a time increment equal to predetermined difference in period between the internal reference and the received modulated signal.

In some embodiments, the time-to-digital converter 220 operates without the use of an external trigger such as a clock signal. That is, the time-to-digital converter 220 measures the time between two features (e.g., two rising edges) of the frequency-divided signal rather than the time between an external trigger signal and a rising edge of the frequency-divided signal. Because the start and end of the time period measured by the time-to-digital converter 220 are both triggered by the frequency-divided signal, rather than an external clock signal, the time-to-digital converter 220, is referred to herein as a self-triggered time-to-digital converter. In some embodiments, the time-to-digital converter 220 may be implemented by comparing, e.g., the frequency-divided signal with an external clock signal, such that the time-to-digital converter 220 may be triggered externally.

In the example of FIG. 2, the self-triggered time-to-digital converter 220 may provide a digital time output that represents the period of the frequency-divided output signal. The digital time output may be provided to a digital subtractor 225. The digital subtractor 225 operates to subtract a period offset value T from the digital time output, thereby generating an offset digital time output signal. The period offset value may be a constant value corresponding to an expected period of the frequency-divided signal in an unmodulated state, which may be expressed in native units used by the time-to-digital converter. For example, where the frequency of the frequency-divided signal is expressed by $f_d$, the period offset value T may be expressed by:

$$T = \frac{1}{f_d \cdot LSB} \qquad \text{Eq. 3}$$

where LSB is the amount of time represented by the least significant bit of the time-to-digital converter. The offset digital time output is thus at or near zero when no shift is occurring in the phase of the frequency-divided signal.

To generate a phase shift, a momentary frequency shift does occur in the modulated radio-frequency signal. This results in a temporary change in the period of the modulated radio-frequency signal, which in turn causes a temporary change in the period of the frequency-divided signal. This temporary change in the period of the frequency-divided signal is measured as a temporary change in the digital time output (and in the offset digital time output). In some embodiments, the offset digital time output is at or near zero during periods when the phase of the modulated radio-frequency signal remains steady, while a shift in the phase of the modulated radio-frequency signal results in the offset digital time output signal briefly taking on a positive or negative value, depending on the direction of the phase shift.

The offset digital time output signal is provided to a digital integrator 230, which may be implemented in configurable receiver 200 using a digital adder 232 and a register 234. In other embodiments, alternative implementations of the digital integrator may be used. The digital integrator generates an integrated time signal. The register 234 may be clocked using the frequency-divided signal, resulting in one addition per cycle of the frequency-divided signal. In embodiments in which the offset digital time output signal represents a change in the phase of the modulated radio-frequency signal, the integrated time signal provides a value that represents the current phase of the modulated radio-frequency signal.

In configurable receiver 200, the integrated time signal may be resampled using a register 235, which may be clocked by a clock source (not shown). In some embodiments, the register 235 operates to sample the integrated time signal at 160 Msps, although other sampling rates may alternatively be used. In some embodiments, the phase signal generation is synchronous with the receiver clock, and no resampling is used.

In some embodiments, the beacon transmission is rapidly detected by a beacon identification signal generated in response to certain events, such as (i) the identification of Barker sequences by a Barker sequence correlator, or (ii) by a large AGC adjustment followed by AGC gain convergence. In such scenarios, the continuing BPSK beacon signal may be processed by freezing the AGC adjustment, and setting the amplitude value provided to (or processed by) the CORDIC to a constant value (e.g., an amplitude of "1").

In particular, in some embodiments, configurable receiver 200 may further comprise an amplitude path. Elements of the amplitude path include amplitude detection circuit 266 having mixer 245, low pass filter 250, analog-to-digital circuit 260 and alignment logic 265. In one embodiment, amplitude detection circuit 266 may be implemented as an envelope detector, operating to provide a signal representing the amplitude of the modulated radio-frequency signal. The envelope detector may operate using various techniques such as, for example, signal rectification followed by low-pass filtering. In one embodiment, the amplitude path may include mixer 245 and low pass filter 250. In one embodiment, mixer 245 receives the output of LNA 205 and the output of XOR 246, which is coupled to oscillator 212 and generates a frequency, such as a carrier frequency. The signal representing the amplitude of the modulated radio-frequency signal may be converted to a digital form with an analog-to-digital converter (ADC) 260. In some embodiments, ADC 260 samples the amplitude of the modulated radio-frequency signal at 160 Msps.

In some embodiments, an alignment logic 265 may be provided to provide temporal alignment between the amplitude signal from ADC 260 and the phase signal from register 235, accommodating different processing delays in the generation of the amplitude signal versus the phase signal.

In one embodiment, the aligned amplitude and phase signals may be provided to coordinate rotation digital computer (CORDIC) logic circuit 270. The CORDIC logic 270 is operative to identify in-phase (I) and quadrature (Q) components corresponding to a phase-modulated radio-frequency input signal. In some embodiments, the identified I and Q components may be processed and/or analyzed to demodulate the received signal, as known to those of skill in the art.

In some embodiments, the configurable receiver 200 may operate on a constant envelope modulated signal, such as a BPSK-modulated beacon signal. In such cases, the configurable receiver 200 may operate in a reduced power mode. In such a reduced power mode, the amplitude path of the signal may be selectively disabled, and rather than a received and processed amplitude signal, a constant amplitude value (such as a constant amplitude of 1) may be input to the CORDIC logic 270 to process the phase signal. For example, in one embodiment, configurable receiver 200 includes mode control circuit 290 at least coupled to the input of CORDIC 270 and, in one embodiment, coupled to the input of configurable receiver 200, such as at the input or output of LNA 205 to control the mode of operation for configurable receiver 200. A beacon detection signal 295 may be generated if (i) the AGC settles following a large jump, or (ii) a beacon synchronization pattern is detected. If a beacon detection signal 295 is generated, a low power mode may be implemented by turning off the amplitude path 290 and injecting, for example, a constant "1" to a multiplexer 297 and selecting the constant "1" to be outputted to CORDIC 270 as representative of the amplitude signal. If no beacon detection signal 295 is detected, the amplitude signal provided to CORDIC 270 may default to the amplitude signal generated by the amplitude detection circuit 266. For some embodiments, the beacon detection signal 295 may be generated by a MAC coprocessor, such as the MAC coprocessor 110 shown in FIG. 1.

The CORDIC converts the polar signals to I and Q signals, which are output to the baseband circuit 296. Of course, it will be understood that variations on the specific example configurable multi-mode receiver 200 illustrated in FIG. 2 may also be implemented. For example, instead of being connected between the digital integrator and the digital subtractor, the digital divider 216 may be positioned after the time-to-digital converter 220 in some embodiments, reflecting the distributive property of multiplication.

Figure 3:
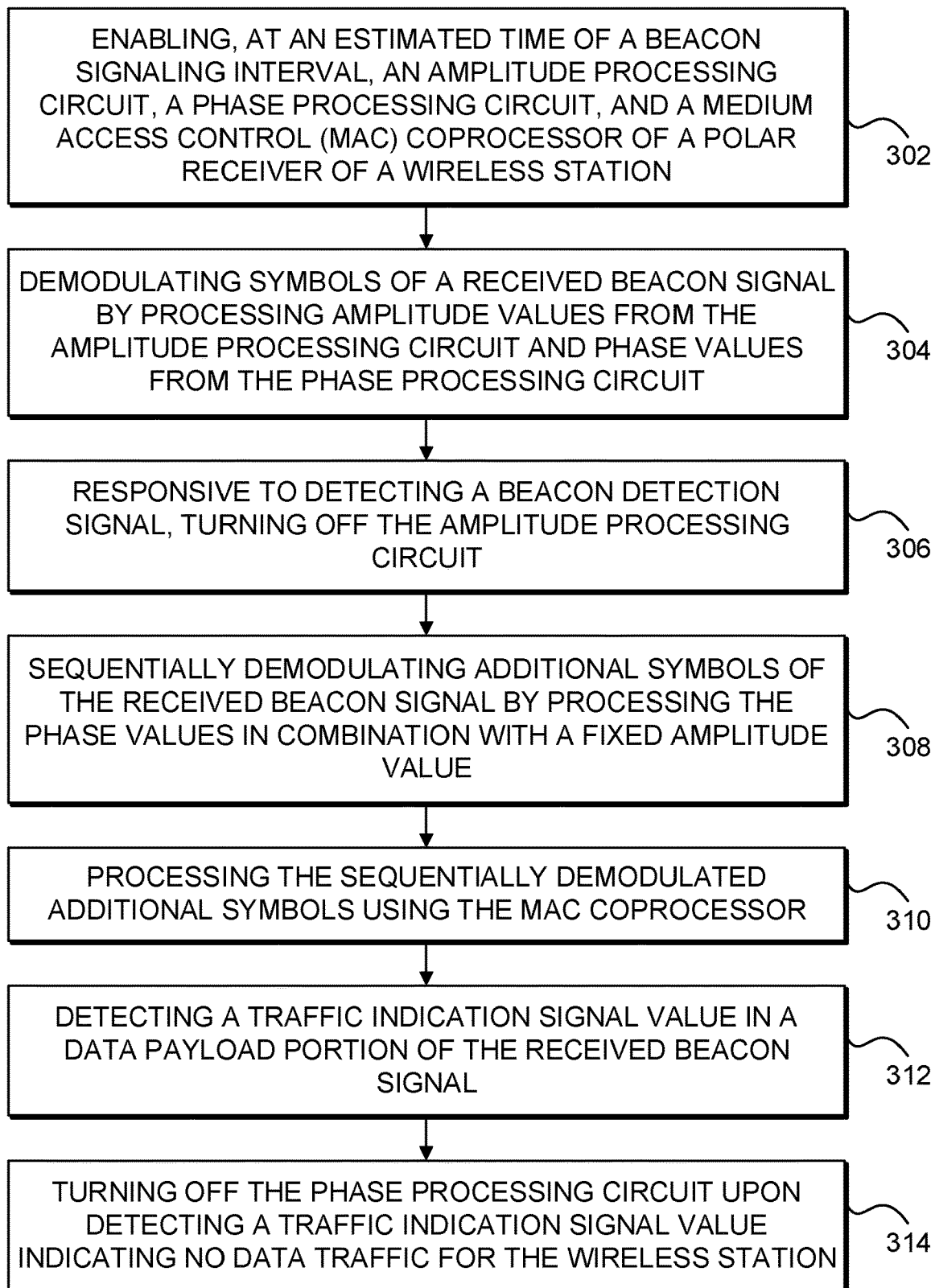
FIG. 3 is a flowchart for turning off amplitude and phase paths of a receiver upon detecting conditions of a beacon message according to some embodiments.

FIG. 3 is a flowchart 300 for turning off amplitude and phase paths of a receiver upon detecting conditions of a beacon message according to some embodiments. A wireless station may perform, for some embodiments, a process that includes: enabling 302, at an estimated time of a beacon signaling interval, an amplitude processing circuit, a phase processing circuit, and a medium access control (MAC) coprocessor of a polar receiver of a wireless station; demodulating 304 symbols of a received beacon signal by processing amplitude values from the amplitude processing circuit and phase values from the phase processing circuit; responsive to detecting a beacon detection signal, turning off 306 the amplitude processing circuit; sequentially demodulating 308 additional symbols of the received beacon signal by processing the phase values in combination with a fixed amplitude value; processing 310 the sequentially demodulated additional symbols using the MAC coprocessor; detecting 312 a traffic indication signal value in a data payload portion of the received beacon signal; and turning off 314 the phase processing circuit upon detecting a traffic indication signal value indicating no data traffic for the wireless station.

For some embodiments, a wireless station operations may include: enabling, at an estimated time of a beacon signaling interval, an amplitude processing circuit and a phase processing circuit of a polar receiver of wireless station; sequentially demodulating symbols of the received beacon signal using at least the phase processing circuit to detect a traffic indication signal value in a data payload portion of the received beacon signal; and shutting off the phase processing circuit upon detecting a traffic indication signal value indicating no data traffic for the wireless station. The wireless station's operations, in some embodiments, may further include: demodulating symbols of the received beacon signal with the polar receiver; and responsive to detecting a beacon preamble symbol sequence, shutting off the amplitude processing circuit and setting an amplitude, wherein sequentially demodulating symbols of the received beacon signal is performed using the phase processing circuit.

Some embodiments of a wireless station apparatus may include: an amplitude processing circuit of a polar receiver of a wireless station, configured to generate amplitude values of a received beacon signal; a phase processing circuit configured to generate phase values of the received beacon signal; a medium access control (MAC) coprocessor configured (i) to demodulate symbols of the received beacon signal by processing the amplitude values and the phase values, (ii) upon receiving indication of a synchronization pattern of the received beacon signal, to turn off the amplitude processing circuit, and (iii) upon receiving a traffic indication signal value indicating no data traffic for the wireless station, to turn off the phase processing circuit; an events circuit configured (i) to detect the synchronization pattern and indicate detection of the synchronization pattern to the MAC coprocessor, and (ii) to detect a traffic indication signal value in a data payload portion of the received beacon signal and send the traffic indication signal value to the MAC coprocessor; and a beacon timing circuit configured to enable, at an estimated time of a beacon signaling interval, the amplitude processing circuit, the phase processing circuit, the medium access control (MAC) coprocessor; and the events circuit.

Figure 4:
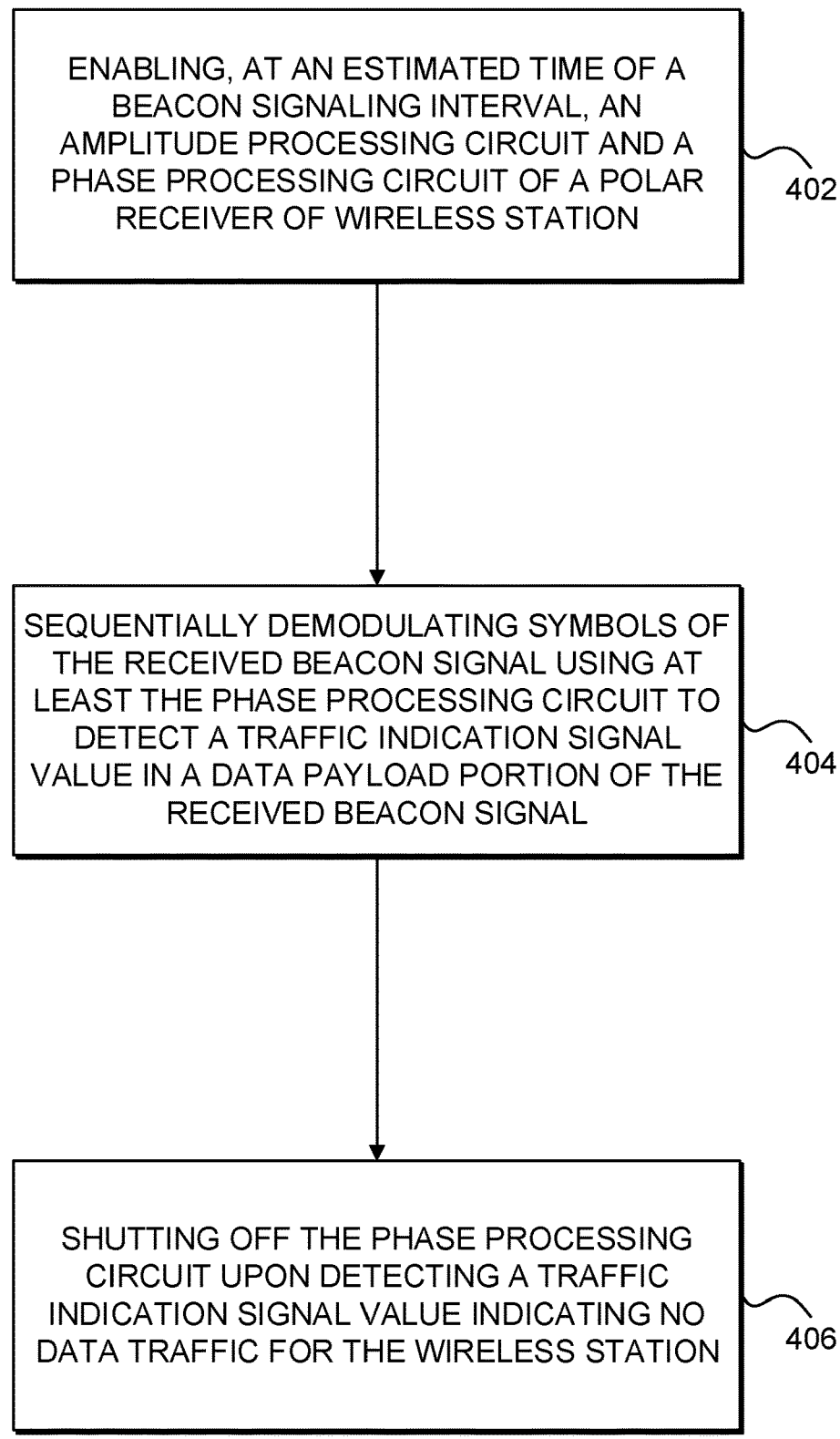
FIG. 4 is a flowchart for turning off the phase path of a receiver upon detecting conditions of a beacon message according to some embodiments.

FIG. 4 is a flowchart 400 for turning off the phase path of a receiver upon detecting conditions of a beacon message according to some embodiments. A wireless station may perform, for some embodiments, a process that includes: enabling 402, at an estimated time of a beacon signaling interval, an amplitude processing circuit and a phase processing circuit of a polar receiver of wireless station. The process also may include sequentially demodulating 404 symbols of the received beacon signal using at least the phase processing circuit to detect a traffic indication signal value in a data payload portion of the received beacon signal. The process may include shutting off 406 the phase processing circuit upon detecting a traffic indication signal value indicating no data traffic for the wireless station.

Figure 5:
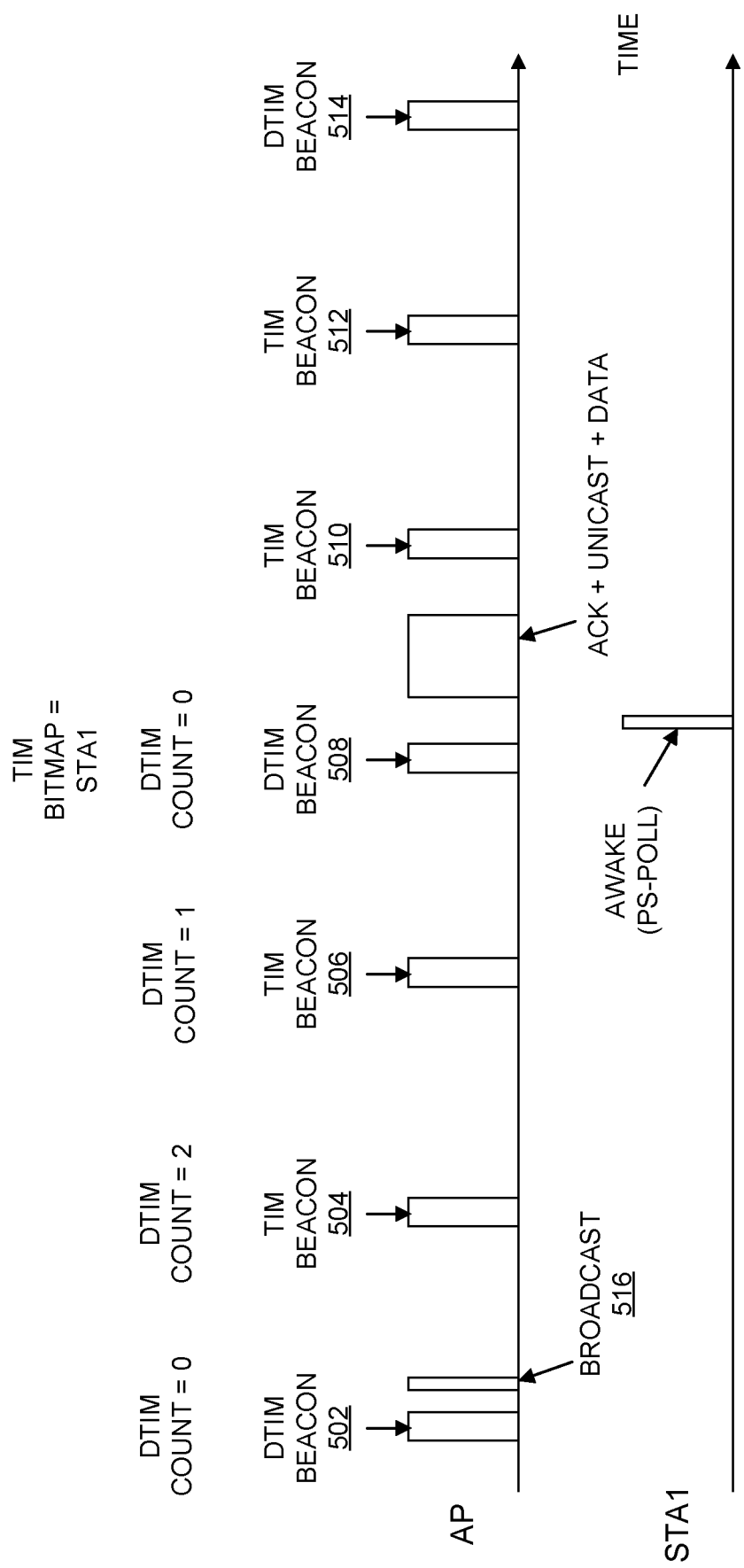
FIG. 5 is a timing diagram for TIM and DTIM beacon messages according to some embodiments.

FIG. 5 is a timing diagram 500 for TIM and DTIM beacon messages (sent by, e.g., an access point (AP)), broadcast, and unicast messages according to some embodiments. A beacon message may be sent generally at a periodic rate according to a beacon interval value. For example, a beacon message may be sent every 100 ms according to a WiFi protocol standard. FIG. 5 labels the beacon messages as TIM beacons 504, 506, 510, 512 and DTIM beacons 502, 508, 514. The interval between TIM beacons 504, 506, 510, 512 and DTIM beacons 502, 508, 514 may be configured. TIM beacons include a DTIM count field, and DTIM beacons correspond to DTIM count=0. The beacons also include a bitmap control byte 680, which is described below with regard to FIG. 6C, that indicates whether multicast/broadcast packets are buffered for transmission following the DTIM beacon. A wireless station, upon receiving a TIM beacon message that indicates unicast data is waiting for the wireless station, may respond back to the access point (AP) with an "awake" message, such as a "PS-Poll" message. The AP may send a unicast message upon receiving the "awake" message. For some embodiments, at certain times, a wireless station may ignore TIM beacons and enter sleep mode while awaiting reception of the next DTIM beacon message. For some embodiments, a wireless station may turn off the wireless station's polar receiver for a period of time exceeding the DTIM beacon signaling interval. For example, if beacon messages are sent every 100 ms, and the DTIM interval is set to 3, then a wireless station may sleep for a period exceeding 200 ms (e.g., 500 ms) and process only every other DTIM beacon message. During sleep mode, the wireless station may turn off the polar receiver completely (including the symbol demodulation crystal oscillator 124 of FIG. 1) and use a crystal oscillator (see, e.g., crystal oscillator 118 of FIG. 1) that is used to determine the wake-up time. The wake-up time may be adjusted iteratively each sleep period to determine a peak wake-up time and to increase the sleep time.

For some embodiments, a DTIM beacon is sent every DTIM interval, which is described in regards to FIG. 6C. TIM beacons are sent in between DTIM beacons. A wireless station may skip TIM beacons when in power saving mode. For example, a DTIM interval may be 3 with beacons sent every 100 ms. At t=0 ms, a DTIM beacon 502 is sent. A broadcast message 516 is sent following the DTIM beacon. The DTIM count, which is described in regards to FIG. 6C, is 0 because the beacon is a DTIM beacon. The wireless station expects to receive another DTIM beacon at t=300 ms. At t=100 ms, a TIM beacon 504 is received, and the DTIM count is two. At t=200 ms, a TIM beacon 506 is transmitted, and the DTIM count is one. At t=300 ms, a DTIM beacon 508 is sent, and the DTIM count is zero. If the wireless station is configured to skip TIM beacons 504, 506 at t=100 and t=200, the wireless station's receiver and transmitter may be in sleep mode a threshold time period prior to t=300 ms. A crystal oscillator 118 may be used to turn on the system at a threshold time period prior to 300 ms. For some embodiments, the threshold time period may be equal to the length of time the receiver (and transmitter for some embodiments) takes to power up plus a safety factor. In some embodiments, the wireless station may skip DTIM beacons if configured to do so. For example, a wireless station may skip every other DTIM beacon. Hence, the wireless station may not exit sleep mode until a threshold time period prior to 600 ms, which is shown as DTIM beacon 514.

FIG. 6A is message structure diagram 600 for a beacon message according to some embodiments. A synchronization pattern 602 ("SYNC") may be received at the beginning of a beacon message, e.g., in the preamble prior to other fields and the payload of the beacon message. The sync pattern 602 may be identified by a Barker sequence correlator for some embodiments. More generally, in some embodiments, the sync pattern may be used by, e.g., the system 100 of FIG. 1 to recognize a beacon and to, e.g., determine whether an amplitude path of the RF circuit 104 (e.g., implemented as a polar receiver, in accordance with some embodiments) may be turned off, e.g., by providing a fixed amplitude value in place of the amplitude processing path.

A beacon message may include three components: a Media Access Control (MAC) header 604, a frame body 606, and a frame check sequence (FCS) 608. For some embodiments, referring to the example shown in FIG. 1, a synchronization pattern 602 is detected and an event is generated and sent to a MAC coprocessor (such as the coprocessor 110 shown in FIG. 1) indicating detection of the synchronization pattern 602. In some embodiments, the baseband circuit 106 may detect the synchronization pattern 602 and may send a signal to the events circuit 112 indicating detection of the synchronization pattern. The events circuit 112 may generate and send to the MAC coprocessor 110 a signal indicating detection of the synchronization pattern 602 for some embodiments. The frame body component 606 of a beacon signal is expanded into the fields shown in FIG. 6B. One of the frame fields, the TIM information element 642, is expanded to show the TIM information element's structure in FIG. 6C.

FIG. 6B is a message structure diagram for frame body fields 630 according to some embodiments. Frame body, or payload, fields may include many different fields in accordance with a WiFi protocol. Some embodiments may include 8 bytes for a timestamp 632, 2 bytes for a beacon interval field 634, 2 bytes for a capability information field 636, up to 32 bytes for a service set identifier (SSID) field 638, and a variable number of bytes for a supported rates field 640. Additional frame fields (not all shown in FIG. 6B) may include, e.g., a frequency-hopping (FH) parameter set field, a direct-sequence (DS) parameter set field, a contention-free (CF) parameter set field, an independent basic service set (IBSS) parameter set field, and a traffic indication map (TIM) information element field 642. Other frame fields, indicated in FIG. 6B with ellipses and the label "other frame body fields" 644, are available per a WiFi protocol For some embodiments, the beacon interval field 634 indicates the quantity of time units (TU) between the start of one beacon signal and next beacon signal. A time unit is equal to 1.024 ms. If the beacon interval field is equal to 100, then a beacon signal may be sent every 102.4 ms. The beacon interval field 634 is used to determine the length of time between beacon signals received by a wireless station. Some embodiments of a wireless station may be in sleep mode for a portion of time between received beacon signals. To determine how long a wireless station may be in sleep mode, some embodiments of a wireless station increment a counter using a crystal oscillator (or other clock device), e.g., crystal oscillator 118 of FIG. 1. If the counter is equal to an estimated wake-up time count, the wireless station exits sleep mode and configures the receiver to receive a beacon signal for some embodiments. An iterative process may be performed to adjust the estimated wake-up time count. Some embodiments of the iterative process include comparing a prior estimated time of the beacon signal interval with an actual time of the beacon signal interval to generate an estimated time adjustment; and updating the estimated time of the beacon signaling interval using the estimated time adjustment. For example, the estimated time may be calculated using Eqs. 4 and 5:

$$Est.\ Time\ Adj. = \frac{Prior\ Estimated\ Time\ Interval - Actual\ Time\ Interval}{2} \quad \text{Eq. 4}$$

$$Est.\ Time = Prior\ Estimated\ Time\ Interval + Est.\ Time\ Adj. \quad \text{Eq. 5}$$

FIG. 6C is a message structure diagram for a TIM information element 670 according to some embodiments. The TIM information element (shown as TIM 642 in condensed form in FIG. 6B and expanded form in FIG. 6C) may be sent with every beacon signal. Each of the fields shown in FIG. 6C is one byte, except the partial virtual bitmap 682, which may be 1 to 251 bytes. For a TIM information element, the element ID field 672 is equal to 5. The length field 674 indicates the number of bytes in the TIM information element.

For some embodiments, the DTIM count field 676 is a countdown counter value that indicates the count until a DTIM beacon is scheduled to be sent. The DTIM count field 676 is decremented with each successive beacon signal transmitted by the access point. If the DTIM count field 676 is zero, the beacon signal is a DTIM beacon signal and a broadcast (multicast) packet may be scheduled to be transmitted by the access point following the beacon message. FIG. 6D will be used to discuss whether broadcast data is available for the wireless station. The DTIM period field 676 indicates the quantity of beacon signals to be transmitted by an access point for each DTIM interval of time.

The partial virtual bitmap field 682 is a variable length bit mask array indicating the presence of buffered frames (such as unicast messages) available from the access point. For example, if the access point has a unicast message for a wireless station, the access point may indicate the presence of the unicast message by setting to I the bit within the bit mask corresponding to the wireless station. In some embodiments, this bit within the bit mask may be described as a TIM value. To reduce the size of the partial virtual bitmap field 682, a bitmap control field 680 is used to indicate which portion of the full traffic indication map (251 bytes) is sent via the partial virtual bitmap field 682.

In some embodiments, a wireless station may analyze the TIM vector, the partial virtual bitmap 682, to determine if the access point has unicast data for the wireless station. If the access point does not have unicast data (corresponding to a TIM value of 0), the receiver and transmitter may be powered down to enter sleep mode and wait until the next DTIM beacon. Some embodiments power down and wait for the next TIM beacon.

FIG. 6D is a message structure diagram for a bitmap control byte within a TIM information element according to some embodiments. FIG. 6D indicates the structure 690 of the bits within the bitmap control byte 680 of a TIM information element. For some embodiments, bit 0 (least significant bit) indicates the availability of broadcast data buffered at an access point for the wireless station. If bit 0 (692) is equal to 1, broadcast data is available at an access point (AP). If bit 0 (692) is equal to 0, no broadcast data is buffered at the AP. Bits 1 to 7 (694) represent an offset to the start of the portion of the full traffic indication map sent via the partial virtual bitmap field 682. Combining the bitmap offset 694 with the TIM information element's length field 674, a wireless station may be able to determine which portion of the full traffic indication map is sent.

In some embodiments, a wireless station may process any broadcast message transmitted by the access point. The MAC coprocessor may determine if bit 0 (692) of the bitmap control byte 680 is set to one. If bit 0 (692) is a one, the access point has broadcast data to send. This bit may be described as a broadcast D value in some portions of this application. In some embodiments, the receiver and transmitter may be shutdown even if bit 0 (692) of the bitmap control byte 680 is a one and the partial virtual bitmap 682 (TIM value) is zero. In some embodiments, the receiver and transmitter may stay powered up if bit 0 (692) of the bitmap control byte 680 is a one and the partial virtual bitmap 682 (TIM value) is zero so that the coprocessor may process the broadcast message that follows the beacon message.

Table 1 shows different scenarios of the TIM value (partial virtual bitmap 682) and the broadcast D value (bit 0 (692) of bitmap control 680).

For some embodiments, the traffic indication map or the partial virtual bitmap 682 may be used to determine the TIM value to indicate no unicast traffic for the wireless station. The traffic indication map is the full unicast data bitmap, and the partial virtual bitmap 682 is a portion of the traffic indication map. The TIM value is the bit within the traffic indication map corresponding to the wireless station.

A broadcast ignore condition, for some embodiments, may indicate that a wireless station will not process (e.g., is configured to ignore) one or more broadcast messages. A broadcast ignore condition may occur, for some embodiments, if the wireless station is fully configured, has limited functionality, and is able to ignore conditions related to other portions of the SSID network unrelated to the wireless station. Some embodiments of a wireless station may limit a broadcast ignore condition such that the wireless station processes a broadcast message every threshold number of broadcast messages. For example, the broadcast ignore condition may have a threshold of 10 broadcast messages so that at least every tenth broadcast message is processed. For some embodiments, upon detecting a traffic indication signal value indicating no data traffic for the wireless station, the wireless station may responsively turn off the receiver

TABLE 1

| TIM Value | Broadcast D Value | Result |
| --- | --- | --- |
| 0 (no unicast data waiting for the wireless station) | 0 (no broadcast data) | Shutdown the receiver (and the transmitter) and go into sleep mode until a threshold period of time prior to transmission of the next DTIM beacon. The crystal oscillator is running, awaiting the end of the DTIM interval. The crystal oscillator causes a wakeup signal to be generated a threshold period of time prior to transmission of the next DTIM beacon if the wireless station is configured to process the next DTIM beacon. |
| 0 (no unicast data waiting for the wireless station) | 1 (broadcast data will be sent by the access point) | The receiver stays powered up so that the coprocessor may process the broadcast message if the wireless station is configured to process the broadcast message. The system is shutdown if the wireless station is configured to ignore the broadcast message. |
| 1 (unicast data is waiting for the wireless station) | 0 or 1 | The receiver stays powered up so that the coprocessor may process the unicast message if the wireless station is configured to process the broadcast message. The wireless station wakes up the transmitter and transmits an "AWAKE" message and listens for a response from the access point. After finishing processing the unicast and/or broadcast message(s), the system enters sleep mode until a threshold period of time prior to the next DTIM beacon message if configured to not skip DTIM beacons. |

For some embodiments, the MAC coprocessor may be shut off upon detecting a traffic indication signal value indicating no data traffic for the wireless station. Detection of a traffic indication signal value indicating no data traffic for the wireless station may be performed in one of multiple ways for some embodiments, such as: (i) detecting a TIM value indicating no unicast traffic for the wireless station, (ii) detecting a TIM value indicating no unicast traffic for the wireless station in combination with a broadcast D value indicating no broadcast traffic, or (iii) detecting a TIM value indicating no unicast traffic for the wireless station in combination with a broadcast D value indicating the presence of broadcast traffic in combination with a broadcast ignore condition. For example, a broadcast ignore condition may occur if the wireless station is a device with a low amount of functionality, and the wireless station is configured to ignore a certain percentage of broadcast messages. For example, the wireless station may be configured to alternate between ignoring and processing broadcast messages.

(which may be a polar receiver). Detecting a traffic indication signal value indicating no data traffic for the wireless station may be performed by demodulating a beacon signal and detecting a data indicator field that indicates no data traffic for the wireless station. A data indicator field may be a TIM value, a broadcast D value, a traffic indication map, or a partial virtual bitmap 682.

Figure 7:
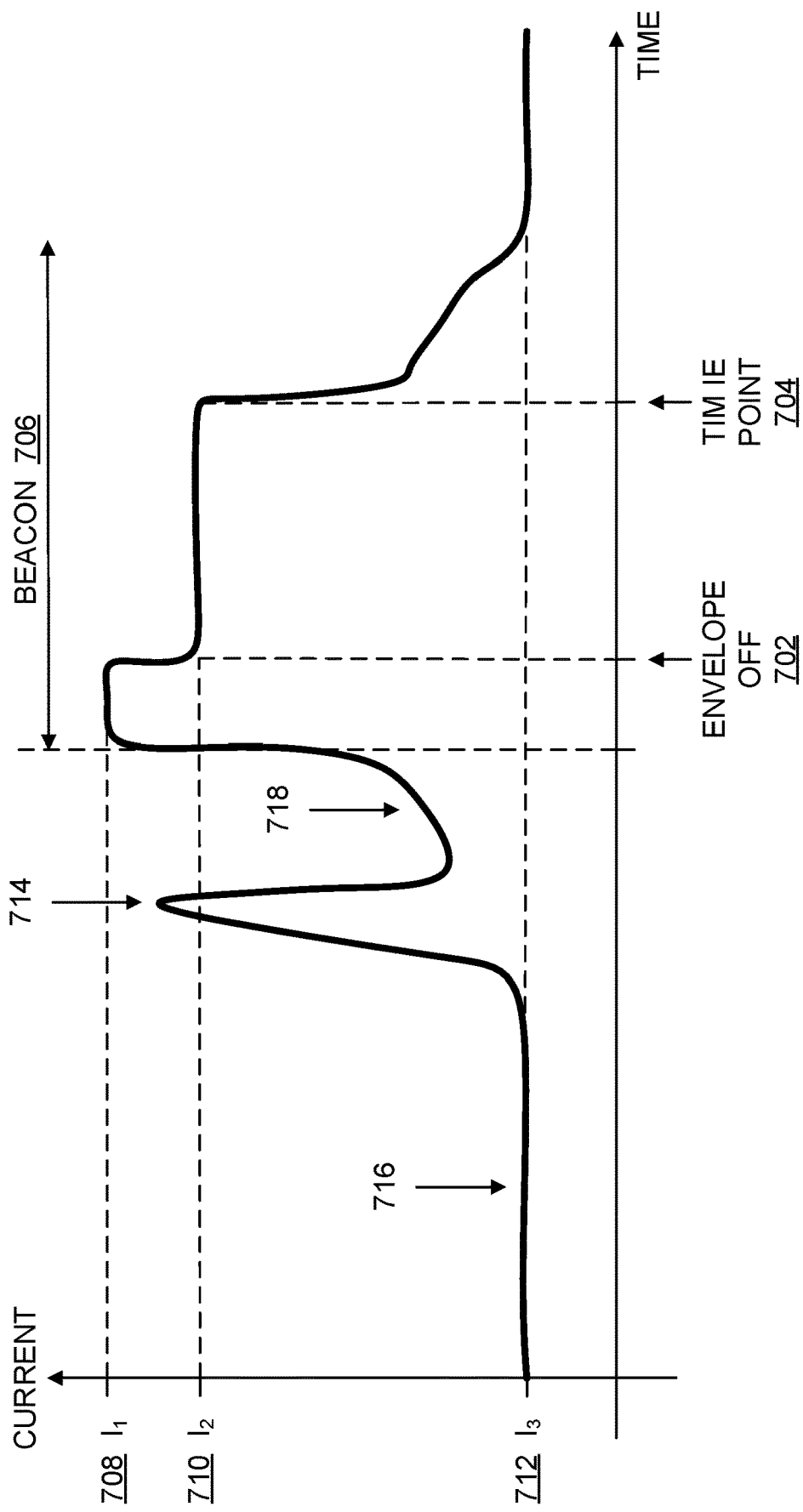
FIG. 7 is a graph of current vs. time for a wireless station receiver receiving a beacon message according to some embodiments.

FIG. 7 is a graph 700 of current vs. time for a wireless station receiver receiving a beacon message according to some embodiments. The graph is not generally drawn to scale and is intended for purposes of explanation. The left portion 716 of FIG. 7 left of the spike 714 in current indicates a low-level current (for example, 12 μA), during, e.g., a sleep mode of the device. The low level current, indicated as $I_3$ 712, may be used to power a crystal oscillator or other time keeping device. A beacon signaling interval may be determined using the beacon interval value shown in FIG. 6B. The beacon interval value may be multiplied by 1.024 ms to calculate a time value for the beacon signal interval. Some embodiments may use units of TU for the beacon signal interval. The receiver current may have a spike 714 upon exiting sleep mode prior to receiving a beacon signal 706. The spike 714 may correspond to powering on the receiver prior to receiving a beacon message. The spike 714 may be due to charging up of capacitors within the power supply of the receiver. The increase in current 718 just prior to receipt of a beacon message corresponds to the start of adjustment of the AGC value using the beacon synchronization pattern. Upon receipt of a beacon signal 706, the receiver's current may increase rapidly and plateau at a current indicated by $I_1$ 708. The current may stay at a high level until the beacon detection signal is identified, either as an AGC convergence event or synchronization pattern identification event. For some embodiments, the envelope off point 702 may occur with the generation of a beacon detection signal. In some embodiments, a beacon detection signal may be generated upon matching the synchronization pattern with a Barker code or sequence of Barker codes. In some embodiments, a beacon detection signal may be generated upon detecting an increase in received signal power exceeding a threshold (indicated by, e.g., a 33 dB AGC adjustment) followed by a settling of an AGC value. The amplitude path (e.g., 266 of FIG. 2) may be turned off and a fixed value may be used for the amplitude value for some embodiments. With the amplitude path turned off at the envelope off point 702, the receiver's current may decrease to the current level indicated by $I_2$ 710. Upon generation of a traffic indication signal such as by the reception of, e.g., the TIM information element (IE) portion of a beacon signal (shown in FIG. 6C), the receiver may determine that no broadcast and/or unicast message is available for the wireless station, and the wireless station may, e.g., enter a sleep mode, and, e.g., may turn off the receiver, decreasing the current to a low level used to maintain, e.g., operation of the crystal oscillator or other timing reference. In some embodiments, the transmitter of the wireless station may be turned off as well, since there may be no need to for the wireless station to send messages if, e.g., no data traffic is expected or available, per the TIM information element portion. FIG. 7 indicates reception of the TIM information element as the TIM IE point 704. The receiver's current may decrease and return to the low-level indicated by $I_3$ 712. For some embodiments, a bias current of a low-noise amplifier (LNA) may be set to a low level value at the TIM/IE point 704 in time.

Some embodiments may set a bias current of a symbol demodulation crystal oscillator to a low level value for processing a beacon message. Upon determining that a broadcast message and/or a unicast message is to be processed by the receiver, the bias current to a symbol demodulation crystal oscillator (such as the symbol demodulation crystal oscillator 124 of FIG. 1) may be increased to enable more accurate demodulation of symbols in broadcast and/or unicast messages. Some embodiments of a wireless station's beacon signal reception process may include: enabling, at the estimated time of the beacon signaling interval, a symbol demodulation crystal oscillator with a bias current; generating, by the symbol demodulation crystal oscillator, a timing reference for the polar receiver to process the beacon signal; and upon detecting a traffic indication signal value indicating a presence of data traffic for the wireless station, increasing the bias current to the symbol demodulation crystal oscillator.

Some embodiments may set a bias current of a low noise amplifier (LNA) to a low level value for processing a beacon message. Upon determining that a broadcast message and/or a unicast message is to be processed by the receiver, the bias current to the LNA may be increased to provide a higher signal to noise ratio to provide for more accurate demodulation of symbols in broadcast and/or unicast messages. The beacon signal reception process, for some embodiments, may include: enabling with a bias current, at the estimated time of the beacon signaling interval, a wideband gain stage of a low noise amplifier (LNA); amplifying, by the LNA, the received beacon signal; and upon detecting the traffic indication signal value indicating the presence of traffic data for the wireless station, increasing the bias current to the LNA. The increase in the bias current to the symbol demodulation crystal oscillator or the LNA may not be immediate but may occur prior to reception and subsequent demodulation of unicast frames for some embodiments.

Figure 8:
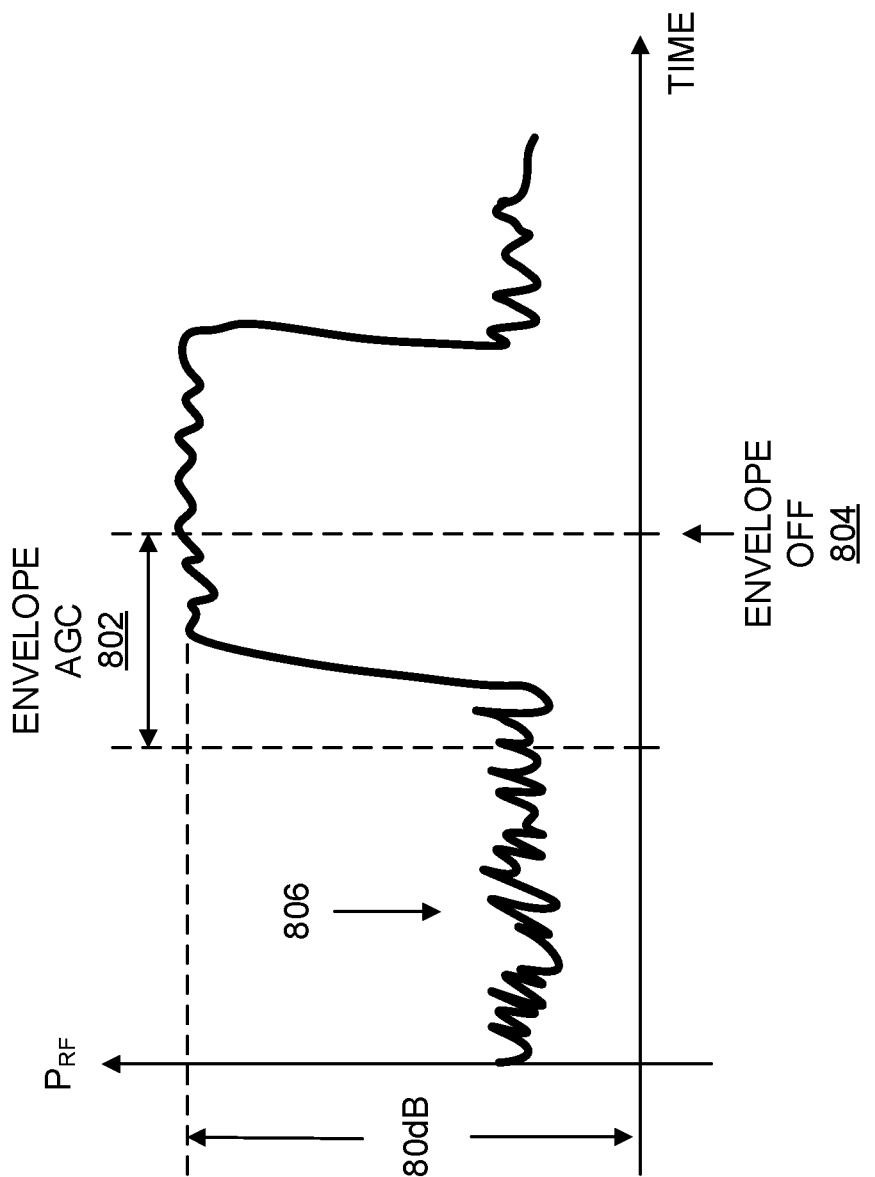
FIG. 8 is a graph of power vs. time for a beacon message according to some embodiments.

FIG. 8 is a graph 800 of power vs. time for a beacon message according to some embodiments. The graph is not generally drawn to scale and is intended for purposes of explanation and not limitation. The left portion 806 of the graph 800 left of the envelope AGC interval 802 indicates that the receiver is adjusting an AGC setting at the beginning of the reception of the beacon. The envelope AGC interval 802 indicates for some embodiments the time period over which the AGC value may be adjusted. The envelope AGC interval 802 may start with the reception of a beacon synchronization pattern prior to a beacon signal. The envelope AGC interval 802 may end 804 with the beacon identification signal. Specifically, if a beacon indication signal is used to turn off the amplitude processing path, no further amplitude information may be available for further assessing a gain setting. For some embodiments, a crystal oscillator indicates a threshold period of time prior to an estimated point in time for reception of a beacon signal. The receiver may be powered up at this point in time as the receiver prepares to receive a beacon signal. An AGC value may be adjusted to increase the gain for the low noise amplifier (LNA). An increase in received signal power exceeding a threshold (e.g., greater than 33 dB) may be detected, such as by large adjustments in AGC settings. At the envelope off point 804, the AGC adjustment period ends. The AGC envelope may end with the detection of the settling of the AGC value, or by a Barker sequence detection, and the amplitude path may be turned off. The wireless station may determine that a fixed value may be used for the amplitude of a beacon signal instead of the actual received amplitude.

For some embodiments, an AGC circuit may detect saturation and a change in gain that exceeds a threshold (such as an increase in gain by more than 33 dB). The AGC circuit may trigger an event circuit to send an event indication to the MAC coprocessor to turn off the amplitude path. Some embodiments of a baseband circuit may detect a barker code that matches the beacon synchronization pattern, and the baseband circuit may trigger the event circuit to send an event indication to the MAC coprocessor to turn off the amplitude path. In some embodiments, the amplitude path is effectively turned off by reducing or shutting off the bias current to one or more signal processing circuit elements in the amplitude signal processing path.

The receiver RF circuit and baseband circuit is controlled by a co-processor. The co-processor will receive events from the baseband circuit and/or event circuits. The co-processor keeps track of the length of the packet and restarts the baseband circuit when needed. Restarting will happen after receiving a beacon frame or falsely detecting a beacon frame. Note that the co-processor is able to use the RF and baseband circuits to process the received beacon on a symbol-by symbol basis, and thus is able to rapidly determine TIM bits and traffic indication signal values. Thus, the receiver architecture utilizing a MAC co-processor provides the ability to rapidly power down the receiver prior to complete demodulation of the beacon frame.

Figure 9:
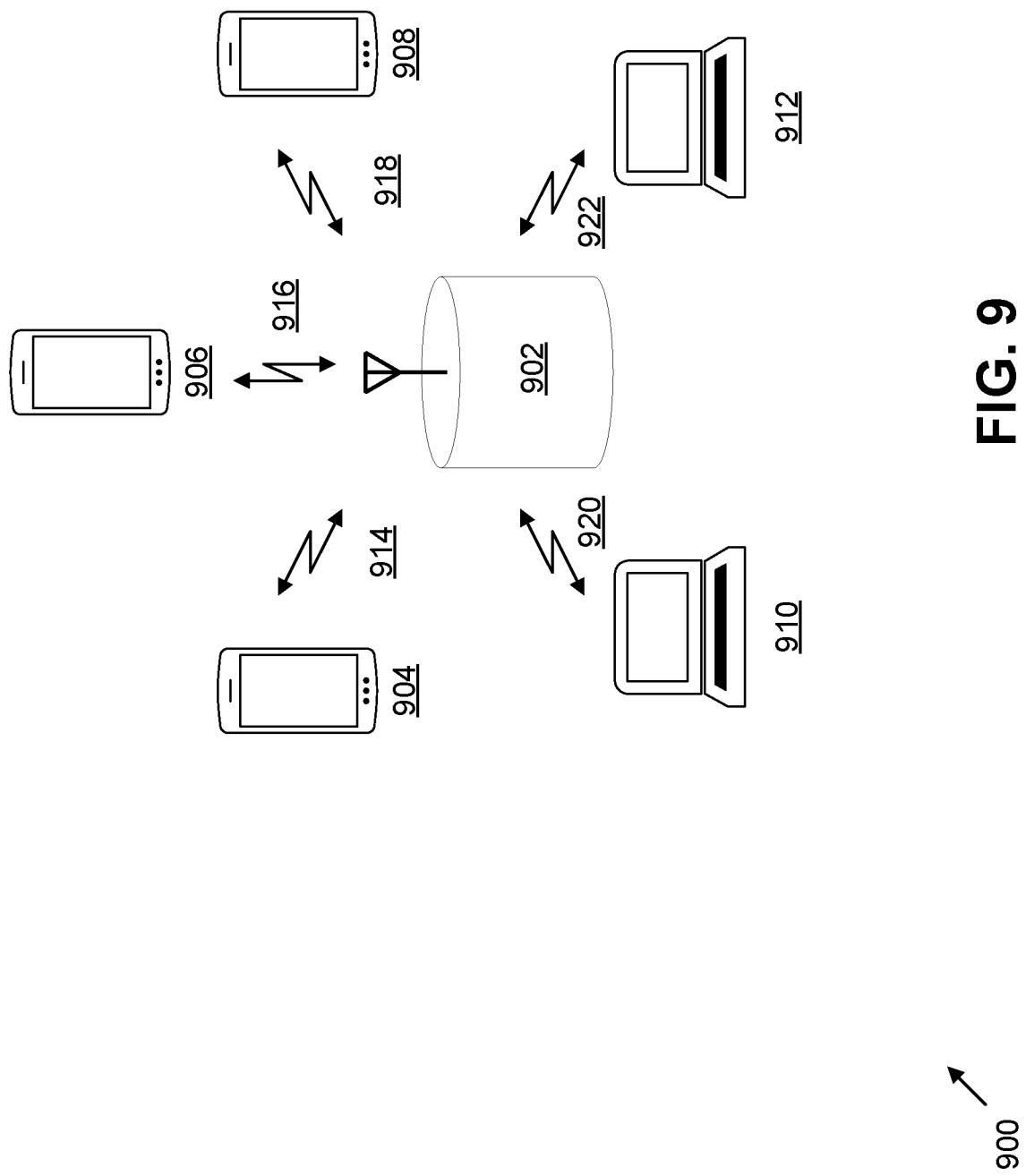
FIG. 9 is a system interface diagram showing an access point and wireless stations according to some embodiments.

FIG. 9 is a system interface diagram showing an access point and wireless stations according to some embodiments. A Wi-Fi network 900 may include an access point 902 that communicates with one or more wireless stations 904, 906, 908, 910, 912. Such communications are shown as wireless RF signals 914, 916, 918, 920, 922 between the access point 902 and the wireless stations 904, 906, 908, 910, 912. Wireless stations may include, for example, smart phones and laptops, which are both depicted, as well as other electronic devices, such as desktops, tablets, watches, printers, servers, switches, routers, speakers, displays, appliances, televisions, radios, and remote controls, among other Wi-Fi capable devices.

In the foregoing specification, specific embodiments have been described. However, one of ordinary skill in the art would appreciate that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein as "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment may be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. The Abstract is submitted with the understanding that the Abstract will not be used to interpret or limit the scope or meaning of the claims. In addition, in the foregoing Detailed Description, the Abstract may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method comprising:
  enabling, at an estimated time of a beacon signaling interval, an amplitude processing circuit and a phase processing circuit of a polar receiver of wireless station;
  demodulating symbols of the received beacon signal by processing amplitude values generated by the amplitude processing circuit and phase values generated by the phase processing circuit;
  detecting a synchronization pattern of the received beacon signal and indicating detection of the synchronization pattern;
  upon receiving indication of the synchronization pattern, turning off the amplitude processing circuit,
  detecting a traffic indication signal value in a data payload portion of the received beacon signal; and
  shutting off the phase processing circuit upon detecting a traffic indication signal value indicating no data traffic for the wireless station.

2. The method of claim 1, further comprising:
  after turning off the amplitude processing circuit and prior to receiving the traffic indication signal value indicating no data traffic for the wireless station, sequentially demodulating additional symbols of the received beacon signal by processing the phase values from the phase processing circuit in combination with a fixed amplitude value.

3. The method of claim 1, further comprising responsive to detecting a traffic indication signal value indicating no data traffic for the wireless station, turning off the polar receiver of the wireless station.

4. The method of claim 3, further comprising setting a bias current of a low-noise amplifier (LNA) to a low level value.

5. The method of claim 3, further comprising setting a bias current of a crystal oscillator circuit to a low level value.

6. The method of claim 1, further comprising turning off the polar receiver of the wireless station for a period of time exceeding the beacon signaling interval.

7. The method of claim 1, further comprising:
  enabling, at the estimated time of the beacon signaling interval, a crystal oscillator with a bias current;
  generating, by the crystal oscillator, a timing reference for the polar receiver to process the beacon signal; and
  upon detecting a traffic indication signal value indicating a presence of data traffic for the wireless station, increasing the bias current to the crystal oscillator.

8. The method of claim 1, further comprising:
  enabling with a bias current, at the estimated time of the beacon signaling interval, a wideband gain stage of a low noise amplifier (LNA);
  amplifying, by the LNA, the received beacon signal; and
  upon detecting a traffic indication signal value indicating the presence of traffic data for the wireless station, increasing the bias current to the LNA.

9. The method of claim 1,
  wherein shutting off the amplitude processing circuit is performed using the MAC coprocessor, and
  wherein shutting off the amplitude processing circuit comprises either turning off a power supply to the amplitude processing circuit or turning off one or more bias currents of the amplitude processing circuit.

10. The method of claim 1, further comprising shutting off the coprocessor upon detecting the traffic indication signal value indicating no data traffic for the wireless station.

11. The method of claim 1, wherein detecting the traffic indication signal value indicating no data traffic for the wireless station comprises one of the group consisting of: (i) detecting a TIM value indicating no unicast traffic for the wireless station, (ii) detecting a TIM value indicating no unicast traffic for the wireless station in combination with a broadcast D value indicating no broadcast traffic, and (iii) detecting a TIM value indicating no unicast traffic for the wireless station in combination with a broadcast D value indicating the presence of broadcast traffic in combination with a broadcast ignore condition.

12. The method of claim 1, further comprising:
  comparing a prior estimated time of the beacon signal interval with an actual time of the beacon signal interval to generate an estimated time adjustment; and
  updating the estimated time of the beacon signaling interval using the estimated time adjustment.

13. An apparatus comprising:
  an amplitude processing circuit of a polar receiver of a wireless station, configured to generate amplitude values of a received beacon signal;
  a phase processing circuit configured to generate phase values of the received beacon signal;
  a medium access control (MAC) coprocessor configured (i) to demodulate symbols of the received beacon signal by processing the amplitude values and the phase values, (ii) upon receiving indication of a synchronization pattern of the received beacon signal, to turn off the amplitude processing circuit, and (iii) upon receiving a traffic indication signal value indicating no data traffic for the wireless station, to turn off the phase processing circuit;
  an events circuit configured (i) to detect the synchronization pattern and indicate detection of the synchronization pattern to the MAC coprocessor, and (ii) to detect a traffic indication signal value in a data payload portion of the received beacon signal and send the traffic indication signal value to the MAC coprocessor; and
  a beacon timing circuit configured to enable, at an estimated time of a beacon signaling interval, the amplitude processing circuit, the phase processing circuit, the medium access control (MAC) coprocessor, and the events circuit.

14. The apparatus of claim 13, wherein the apparatus is further configured to:
  after turning off the amplitude processing circuit and prior to receiving the traffic indication signal value indicating no data traffic for the wireless station, sequentially demodulate additional symbols of the received beacon signal by processing the phase values from the phase processing circuit in combination with a fixed amplitude value.

15. The apparatus of claim 13, wherein the apparatus is further configured to:
  responsive to detecting a traffic indication signal value indicating no data traffic for the wireless station, turning off the polar receiver of the wireless station.

16. The apparatus of claim 13, wherein the apparatus is further configured to:
  turn off the polar receiver of the wireless station for a period of time exceeding the beacon signaling interval.

17. The apparatus of claim 13, wherein the apparatus is further configured to:
  enable, at the estimated time of the beacon signaling interval, a crystal oscillator with a bias current;

generate, by the crystal oscillator, a timing reference for the polar receiver to process the beacon signal; and upon detecting a traffic indication signal value indicating a presence of data traffic for the wireless station, increase the bias current to the crystal oscillator.

18. The apparatus of claim 13, wherein the apparatus is further configured to:

enable with a bias current, at the estimated time of the beacon signaling interval, a wideband gain stage of a low noise amplifier (LNA);

amplify, by the LNA, the received beacon signal; and upon detecting a traffic indication signal value indicating the presence of traffic data for the wireless station, increase the bias current to the LNA.

19. The apparatus of claim 13, wherein the MAC coprocessor is configured to turn off the amplitude processing circuit, and wherein turning off the amplitude processing circuit comprises either turning off a power supply to the amplitude processing circuit or turning off one or more bias currents of the amplitude processing circuit.

20. A method comprising:

enabling, at an estimated time of a beacon signaling interval, an amplitude processing circuit and a phase processing circuit of a polar receiver of wireless station;

demodulating symbols of the received beacon signal by processing amplitude values generated by the amplitude processing circuit and phase values generated by the phase processing circuit;

detecting a synchronization pattern of the received beacon signal and indicating detection of the synchronization pattern;

upon receiving indication of the synchronization pattern, turning off the amplitude processing circuit and setting an amplitude value for subsequent symbol demodulation;

detecting a traffic indication signal value in a data payload portion of the received beacon signal; and shutting off the phase processing circuit upon detecting a traffic indication signal value indicating no data traffic for the wireless station.

* * * * *